US006638160B2

(12) United States Patent
Yoshitomi

(10) Patent No.: US 6,638,160 B2
(45) Date of Patent: Oct. 28, 2003

(54) GAME SYSTEM ALLOWING CALIBRATION OF TIMING EVALUATION OF A PLAYER OPERATION AND STORAGE MEDIUM TO BE USED FOR THE SAME

(75) Inventor: Kensuke Yoshitomi, Tokyo (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/886,292

(22) Filed: Jun. 21, 2001

(65) Prior Publication Data

US 2002/0013166 A1 Jan. 31, 2002

(30) Foreign Application Priority Data

Jun. 23, 2000 (JP) ....................................... 2000-189876

(51) Int. Cl.$^{7}$ ................................................ A63F 13/10
(52) U.S. Cl. ................................ 463/7; 463/1; 463/23; 463/36
(58) Field of Search ............................. 463/1, 7–8, 23, 463/30–33, 35–39, 40–43, 47; 273/148 R, 148 B, 440.1, 440, 445, 459–461; 434/128, 161, 167, 179, 307 R, 307 A, 319–321; 446/408, 486; 84/470 R

(56) References Cited

U.S. PATENT DOCUMENTS 4,613,139 A * 9/1986 Robinson, II .......... 200/DIG. 2
4,657,247 A * 4/1987 Okada ......................... 463/23
4,679,789 A * 7/1987 Okada ......................... 463/23
4,694,723 A 9/1987 Shinohara et al.
5,229,756 A * 7/1993 Kosugi et al. .............. 345/156
5,288,078 A * 2/1994 Capper et al. .............. 345/156
5,488,362 A * 1/1996 Ullman et al. .......... 273/148 B
5,511,053 A * 4/1996 Jae-Chang ............... 369/47.32
5,616,078 A * 4/1997 Oh ............................. 345/156
5,764,164 A * 6/1998 Cartabiano et al. ...... 273/148 B
5,769,719 A * 6/1998 Hsu ....................... 273/148 B
5,773,742 A 6/1998 Eventoff et al.
5,792,972 A * 8/1998 Houston ................... 84/477 R
5,796,354 A * 8/1998 Cartabiano et al. ...... 273/148 B
5,908,997 A * 6/1999 Arnold et al. ................ 84/478
5,913,727 A * 6/1999 Ahdoot ....................... 345/156
5,944,530 A * 8/1999 Ho et al. .................... 434/236
6,025,553 A * 2/2000 Lee ............................. 84/602
6,025,830 A * 2/2000 Cohen ........................ 345/156
6,036,498 A * 3/2000 Kondo ................... 434/307 A
6,086,478 A * 7/2000 Klitsner et al. ............. 273/273
6,141,643 A * 10/2000 Harmon ................. 235/462.44
6,183,365 B1 * 2/2001 Tonomura et al. ...... 273/148 B
6,379,244 B1 * 4/2002 Sagawa et al. ................ 463/7
6,439,998 B1 * 8/2002 Itou ............................ 463/23

FOREIGN PATENT DOCUMENTS

| | | | | |
|---|---|---|---|---|
| EP | 0 903 169 | 3/1999 | | |
| EP | 903169 A2 * | 3/1999 | | ............. A63F/9/22 |
| JP | 57-54998 | 4/1982 | | |
| JP | 7-213745 | 8/1995 | | |
| JP | 10-123932 | 5/1998 | | |
| JP | 2922509 | 4/1999 | | |
| JP | 11-179054 | 7/1999 | | |

* cited by examiner

*Primary Examiner*—Michael O'Neill
*Assistant Examiner*—Scott E. Jones
(74) *Attorney, Agent, or Firm*—Jordan and Hamburg LLP

(57) ABSTRACT

A game system allows timing adjustment for reducing inaccuracy in timing evaluation of an operation performed by a player. The game system includes a storage device for storing reference data defining timing of at least one operation to be performed by a player on an input device associated with an elapsed time from a predetermined position serving as a reference, and an operation instruction device for instructing the player operation timing based on the reference data. An operation detection device detects actual timing of an operation performed on the input device by the player, and an evaluation device evaluates the detected operation by comparing the timing of the operation defined in the reference data and the detected timing. An adjustment value setting device allows the player to correct an evaluation result, and an adjustment execution device changes the operation timing with the predetermined position being used as a reference.

16 Claims, 17 Drawing Sheets

GAME SYSTEM ALLOWING CALIBRATION OF TIMING EVALUATION OF A PLAYER OPERATION AND STORAGE MEDIUM TO BE USED FOR THE SAME

BACKGROUND OF THE INVENTION

The present invention relates to a game system using a computer and a storage medium to be used for such game system.

A number of game systems using a computer request a particular operation of a player, and detect an operation actually performed by the player in response to the request. Such game systems then evaluate the detected operation, and execute a process, for example, calculating a score, varying progress of the game or the like in accordance with an evaluation result. The evaluation of the operation can be done in accordance with various procedures. In one instance, to evaluate operation, a deviation amount between timing of requesting the operation and timing when the player actually performs the operation in response to the request is detected, and the smaller the deviation amount, the higher the evaluation. As a typical instance in which such process is executed, a game system is provided which randomly chooses one operation portion in a plurality of operation portions to which the player can operate to thereby instruct an operation thereon, detects how long the player's operation is delayed from the instruction, and increases the evaluation as the delayed time is shortened.

The evaluation of the operation based on the deviation of the timing is carried out in a music game directed to operation in time with music. In such game, timing of a series of operations to be done in time with the music reproduced as background music (hereinafter BGM) is defined in advance and information corresponding thereto is prepared as data. During game play, the BGM is reproduced and, in connection with progress of the music, the player is instructed to perform operation in accordance with timing defined in the data. If the player performs the operation to follow the instruction, the game system compares the timing when each operation is done with the timing defined in advance, and the smaller the deviation amount therebetween, the higher the evaluation to the player's operation.

However, in a game system which considers the operation timing as an element for the evaluation, there is a possibility that the player's feeling of reality does not match the evaluation in the game, thereby causing the player to have feeling of having been wrongly evaluated. For example, the operation may be evaluated low, even when the player himself believes that he has performed the operation at a proper timing, or in the contrary case, the evaluation may be high, even though the player feels he has performed the operation at inadequate timing.

One of the causes for introducing such feeling of evaluation inaccuracy is the existence of another system or device as the reference besides the game system being used. As the typical instance thereof, there is a case that game software is diverted from the arcade-type game machine to the household game machine and vice versa. Between the arcade-type game machine and the household game machine, the hardware configurations and the details of the programs are different from each other. Therefore, even if the contents of each game seem to be the same at a first sight, there may be many differences, for example, responsiveness of an input device (timing of detecting the operation), or the differences in the procedure of the process for evaluation the operation. Such differences contribute to the feeling of wrongful evaluation. In the case of the music game, the player having already received a higher evaluation in the game play on the arcade-type game machine sometimes fails to obtain the evaluation that he or she believes appropriate in game play with the household game machine, even if the player chooses the same tune as that in the game play with the arcade-type game machine. The system or device to be as used as the reference is not limited to a game machine. For example, if in the case of providing an input device imitating an actual rifle or the like for a shooting game, there is a possibility that the relationship between an operation of a trigger and a timing when a bullet is actually shot is different from that in the actual rifle. In such case, if the person well accustomed to rifle shooting plays the game, that person may fail to obtain the result he or she believes appropriate, resulting in loss of the player's interest in the game. Further, even if the input device does not exist as a real device, when the player exchanges input devices, the same feeling of inaccurate evaluation due to an individual difference or property of the particular input device with respect to responsiveness thereof may result.

SUMMARY OF THE INVENTION

It is, therefore, an object of the present invention to provide a game system capable of solving or reducing the feeling of evaluation inaccuracy to thereby improve interest of a game, and a storage medium suitable for being used in such system.

To achieve the above object, in the first aspect of the present invention, there is provided a game system comprising a storage device for storing reference data defining timing of at least one operation to be performed by a player on an input device in association with an elapsed time from a predetermined position as a reference in a game; an operation instruction device for instructing the player operation timing based on the reference data; an operation detection device for detecting actual timing of an actual operation performed on the input device by the player; an evaluation device for evaluating the actual operation detected by the operation detection device by comparing the timing of the operation defined in the reference data and the detected actual timing with each other; an adjustment value setting device for making the player perform a predetermined adjustment value setting operation and for setting an adjustment value to correct an evaluation result based on a result of execution of the adjustment value setting operation; and an adjustment execution device for changing the operation timing to be instructed by the operation instruction device based on the adjustment value with the predetermined position in the game being as a reference.

According to the above game system, if the adjustment has been executed, the operation timing instructed by the operation instruction device shifts in accordance with the adjustment value from the original timing of the operation which is defined to suppose the predetermined position in the game as the reference. Therefore, if the player has feeling of inaccuracy with respect to the correspondence relationship between the operation and the evaluation thereto, it is possible to execute the adjustment setting operation to thereby enable the player to play at the timing suitable for himself or herself.

In the second aspect of the present invention, there is provided a game system comprising: a storage device for storing a reference data defining timing of at least one operation to be performed by a player on an input device in association with an elapsed time from a predetermined position as a reference in a game; an operation instruction device for instructing the player operation timing based on the reference data; an operation detection device for detecting actual timing of an actual operation performed on the input device by the player; an evaluation device for evaluating the actual operation detected by the operation detection device by comparing the timing of the operation defined in the reference data and the detected actual timing with each other; an adjustment value setting device for making the player perform a predetermined adjustment value setting operation and for setting an adjustment value to correct an evaluation result based on a result of execution of the adjustment value setting operation; and an adjustment execution device for adjusting a deviation amount between the timing defined in the reference data and the actual timing detected by the operation detection device based on the adjustment value.

According to this game system, if the detected timing of the operation actually performed by the player shifts from the original timing of the operation which is defined so as to suppose the predetermined position in the game as the reference, the deviation amount can be adjusted in accordance with the adjustment value. Therefore, if the player has feeling of inaccuracy with respect to the correspondence relationship between the operation and the evaluation thereto, it is possible to execute the adjustment setting operation to thereby enable the player to obtain the evaluation as he or she believes appropriate without the player having to change the timing of the operation.

In the third aspect of the present invention, there is provided a game system comprising: a storage device for storing a reference data defining timing of at least one operation to be performed by a player on an input device in association with an elapsed time from a predetermined position as a reference in a game; an operation instruction device for instructing the player operation timing based on the reference data; an operation detection device for detecting actual timing of an actual operation performed on the input device by the player; an evaluation device for evaluating the actual operation detected by the operation detection device by comparing the timing of the operation defined in the reference data and the detected actual timing with each other; an adjustment value setting device for making the player perform a predetermined adjustment value setting operation and for setting an adjustment value to correct an evaluation result based on a result of execution of the adjustment value setting operation; and an adjustment execution device for changing a relationship between a deviation amount of the actual timing detected by the operation detection device to the timing defined in the reference data and an evaluation result by the evaluation device based on the adjustment value.

According to this game system, if the detected timing of the operation actually performed by the player shifts from the original timing of the operation which is defined so as to suppose the predetermined position in the game as the reference, the relationship between the deviation amount and the evaluation can be adjusted in accordance with the adjustment value. Therefore, if the player has feeling of inaccuracy with respect to the correspondence relationship between the operation and the evaluation thereto, it is possible to execute the adjustment setting operation to thereby enable the player to obtain the evaluation as he or she believes appropriate without the player having to change the timing of the operation.

In the fourth aspect of the present invention, there is provided a game system comprising: a tune reproduction device for reproducing a tune with a predetermined position in a game being as a reference; a storage device for storing a reference data defining timing of at least one operation to be performed by a player on an input device during a reproduction of the tune in association with a position in the tune to be reproduced in a game; an operation instruction device for instructing the player operation timing based on the reference data during the reproduction of the tune; an operation detection device for detecting actual timing of an actual operation performed on the input device by the player during the reproduction of the tune; an evaluation device for evaluating the actual operation detected by the operation detection device by comparing the timing of the operation defined in the reference data and the detected actual timing with each other; an adjustment value setting device for making the player perform a predetermined adjustment value setting operation and for setting an adjustment value to correct an evaluation result based on a result of execution of the adjustment value setting operation; and an adjustment execution device for changing a deviation amount between the position in the tune and the operation timing to be instructed by the operation instruction device based on the adjustment value when the tune is reproduced.

According to this game system, if the adjustment has been executed, the operation timing instructed by the operation instruction device shifts in accordance with the adjustment value from the original timing of the operation which is defined to suppose the predetermined position in the game as the reference. Therefore, if the player has feeling of inaccuracy with respect to the mutual relationship among the reproduction of the tune, the timing of instructing the operation and the evaluation to the operation, it is possible to execute the adjustment setting operation to thereby enable the player to play at the timing suitable for himself or herself.

In the fifth aspect of the present invention, there is provided a game system comprising: a tune reproduction device for reproducing a tune with a predetermined position in a game being as a reference; a storage device for storing a reference data defining timing of at least one operation to be performed by a player on an input device during a reproduction of the tune in association with a position in the tune to be reproduced in a game; an operation instruction device for instructing the player operation timing based on the reference data during the reproduction of the tune; an operation detection device for detecting actual timing of an actual operation performed on the input device by the player during the reproduction of the tune; an evaluation device for evaluating the actual operation detected by the operation detection device by comparing the timing of the operation defined in the reference data and the detected actual timing with each other; an adjustment value setting device for making the player perform a predetermined adjustment value setting operation and for setting an adjustment value to correct an evaluation result based on a result of execution of the adjustment value setting operation; and an adjustment execution device for adjusting a deviation amount between the timing of the operation defined in the reference date and the actual timing detected by the operation detection device based on the adjustment value.

According to this game system, if the detected timing of the operation actually performed by the player shifts from the original timing of the operation which is defined so as to suppose the predetermined position in the game as the reference, the deviation amount can be adjusted in accordance with the adjustment value. Therefore, if the player has feeling of inaccuracy with respect to the mutual relationship among the reproduction of the tune, the instruction of the operation and the evaluation to the operation, it is possible to execute the adjustment setting operation to thereby obtain the evaluation that he or she believes appropriate without the player having to change the timing of the operation.

In the sixth aspect of the present invention, there is provided a game system comprising: a tune reproduction device for reproducing a tune with a predetermined position in a game being as a reference; a storage device for storing a reference data defining timing of at least one operation to be performed by a player on an input device during a reproduction of the tune in association with a position in the tune to be reproduced in a game; an operation instruction device for instructing the player operation timing based on the reference data during the reproduction of the tune; an operation detection device for detecting actual timing of an actual operation performed on the input device by the player during the reproduction of the tune; an evaluation device for evaluating the actual operation detected by the operation detection device by comparing the timing of the operation defined in the reference data and the detected actual timing with each other; an adjustment value setting device for making the player perform a predetermined adjustment value setting operation and for setting an adjustment value to correct an evaluation result based on a result of execution of the adjustment value setting operation; and an adjustment execution device for changing a relationship between a deviation amount of the actual timing detected by the operation detection device to the timing defined in the reference data and an evaluation result by the evaluation device based on the adjustment value.

According to this game system, if the detected timing of the operation actually performed by the player shifts from the original timing of the operation which is defined so as to suppose the predetermined position in the game as the reference, the relationship between the deviation amount and the evaluation can be adjusted in accordance with the adjustment value. Therefore, if the player has feeling of inaccuracy with respect to the mutual relationship among the reproduction of the tune, the instruction of the operation and the evaluation to the operation, it is possible to execute the adjustment setting operation to thereby obtain the evaluation that he or she believes appropriate without the player having to change the timing of the operation.

The present invention can be embodied in a computer readable storage medium as described below.

In the seventh aspect of the present invention, there is provided a computer readable storage medium storing a program which causes a computer provided in a game system to serve as: an operation instruction device for instructing a player operation timing based on a reference data which defines timing of at least one operation to be performed by the player on an input device in association with an elapsed time from a predetermined position as a reference in a game; an operation detection device for detecting actual timing of an actual operation performed on the input device by the player; an evaluation device for evaluating the actual operation detected by the operation detection device by comparing the timing of the operation defined in the reference data and the detected actual timing with each other; an adjustment value setting device for making the player perform a predetermined adjustment value setting operation and for setting an adjustment value to correct an evaluation result based on a result of execution of the adjustment value setting operation; and an adjustment execution device for changing the operation timing to be instructed by the operation instruction device based on the adjustment value with the predetermined position in the game being as a reference.

In the eighth aspect of the present invention, there is provided a computer readable storage medium storing a program which causes a computer provided in a game system to serve as: an operation instruction device for instructing a player operation timing based on a reference data which defines timing of at least one operation to be performed by the player on an input device in association with an elapsed time from a predetermined position as a reference in a game; an operation detection device for detecting actual timing of an actual operation performed on the input device by the player; an evaluation device for evaluating the actual operation detected by the operation detection device by comparing the timing of the operation defined in the reference data and the detected actual timing with each other; an adjustment value setting device for making the player perform a predetermined adjustment value setting operation and for setting an adjustment value to correct an evaluation result based on a result of execution of the adjustment value setting operation; and an adjustment execution device for adjusting a deviation amount between the timing defined in the reference data and the actual timing detected by the operation detection device based on the adjustment value.

In the ninth aspect of the present invention, there is provided a computer readable storage medium storing a program which causes a computer provided in a game system to serve as: an operation instruction device for instructing a player operation timing based on a reference data which defines timing of at least one operation to be performed by the player on an input device in association with an elapsed time from a predetermined position as a reference in a game; an operation detection device for detecting actual timing of an actual operation performed on the input device by the player; an evaluation device for evaluating the actual operation detected by the operation detection device by comparing the timing of the operation defined in the reference data and the detected actual timing with each other; an adjustment value setting device for making the player perform a predetermined adjustment value setting operation and for setting an adjustment value to correct an evaluation result based on a result of execution of the adjustment value setting operation; and an adjustment execution device for changing a relationship between a deviation amount of the actual timing detected by the operation detection device to the timing defined in the reference data and an evaluation result by the evaluation device based on the adjustment value.

In the tenth aspect of the present invention, there is provided a computer readable storage medium storing a program which causes a computer provided in a game system to serve as: a tune reproduction device for reproducing a tune with a predetermined position in a game being as a reference; an operation instruction device for instructing a player operation timing during the reproduction of the tune based on a reference data which defines timing of at least one operation to be performed by the player on an input device during a reproduction of the tune in association with a position in the tune to be reproduced in the game; an operation detection device for detecting actual timing of an actual operation performed on the input device by the player during the reproduction of the tune; an evaluation device for evaluating the actual operation detected by the operation detection device by comparing the timing of the operation defined in the reference data and the detected actual timing with each other; an adjustment value setting device for making the player perform a predetermined adjustment value setting operation and for setting an adjustment value to correct an evaluation result based on a result of execution of the adjustment value setting operation; and an adjustment execution device for changing a deviation amount between the position in the tune and the operation timing to be instructed by the operation instruction device based on the adjustment value when the tune is reproduced.

In the eleventh aspect of the present invention, there is provided a computer readable storage medium storing a program which causes a computer provided in a game system to serve as: a tune reproduction device for reproducing a tune with a predetermined position in a game being as a reference; an operation instruction device for instructing a player operation timing during the reproduction of the tune based on a reference data which defines timing of at least one operation to be performed by the player on an input device during a reproduction of the tune in association with a position in the tune to be reproduced in the game; an operation detection device for detecting actual timing of an actual operation performed on the input device by the player during the reproduction of the tune; an evaluation device for evaluating the actual operation detected by the operation detection device by comparing the timing of the operation defined in the reference data and the detected actual timing with each other; an adjustment value setting device for making the player perform a predetermined adjustment value setting operation and for setting an adjustment value to correct an evaluation result based on a result of execution of the adjustment value setting operation; and an adjustment execution device for adjusting a deviation amount between the timing of the operation defined in the reference date and the actual timing detected by the operation detection device based on the adjustment value.

In the twelfth aspect of the present invention, there is provided a computer readable storage medium storing a program which causes a computer provided in a game system to serve as: a tune reproduction device for reproducing a tune with a predetermined position in a game being as a reference; an operation instruction device for instructing a player operation timing during the reproduction of the tune based on a reference data which defines timing of at least one operation to be performed by the player on an input device during a reproduction of the tune in association with a position in the tune to be reproduced in the game; an operation instruction device for instructing the player operation timing based on the reference data during the reproduction of the tune; an operation detection device for detecting actual timing of an actual operation performed on the input device by the player during the reproduction of the tune; an evaluation device for evaluating the actual operation detected by the operation detection device by comparing the timing of the operation defined in the reference data and the detected actual timing with each other; an adjustment value setting device for making the player perform a predetermined adjustment value setting operation and for setting an adjustment value to correct an evaluation result based on a result of execution of the adjustment value setting operation; and an adjustment execution device for changing a relationship between a deviation amount of the actual timing detected by the operation detection device to the timing defined in the reference data and an evaluation result by the evaluation device based on the adjustment value.

In the above aspects of the present invention, said adjusting value setting device may change the adjustment value based on an amount of an operation by the player to a specific operation portion in the input device. The adjusting value setting device may cause the operation instruction device to instruct an operation at predetermined timing with said predetermined position being used as a reference, and may set the adjusting value based on a deviation amount between said instructed timing of the operation and an actual timing detected by the operation detection device in response to that instruction.

In the fourth and twelfth aspects of the present invention, there may be defined, in the reference data, timing of a series of operations to be performed on the input device by the player during the reproduction of the tune. The operation instruction device may cause a display device to display on a screen thereof instruction signs which correspond to said series of the operations, respectively, and a predetermined reference sign, and may also move at least one of each instruction sign and the reference sign in a predetermined direction on the screen at a speed corresponding to a tempo of the tune to thereby instruct the player respective timing of said series of the operations through a coincidence of said each instruction sign and the reference sing. Further, the adjustment execution device may change, based on the adjustment value, the timing when said each instruction sign and the reference sign coincide with each other with said predetermined position being as the reference.

In the present invention, if the timing of the operation is defined in the reference data so as to be associated with the elapsed time from the predetermined position in the game, the timing can be represented by the elapsed time itself or a parameter associated with the elapsed time. If the timing of the operation is defined in the reference data so as to be associated with the position in the tune, the timing can be represented by the elapsed time itself from the proper position (for example, the reproduction start position) in the tune or a parameter associated with the elapsed time.

The timing of detecting the operation may be specified based on the elapsed time from the predetermined position, or may be specified based on an elapsed time from another position. In the former case, the timing of the operation defined in the reference data and the operation detected timing are compared with each other with the same position being used as the reference. If there is delay in the response from when the operation is actually performed until the operation is actually detected, it may be possible to perform the evaluation taking the delay into account. By performing such process, it is possible to determine the deviation of the timing more exactly. In the game system directed to play the music game, there is a possibility that the player feels the deviation in comparison with the reproduction of the tune, even through the player does not feel an inaccuracy with respect to the relationship between the timing instructed to the player and the result of the evaluation. According to the fourth and tenth aspects of the present invention, it is possible to change, in connection with the adjustment of the timing of instructing the operation, the position considered as the reference for the timing of detecting the operation from the predetermined position which is referred to as the reference in the reproduction of the tune, so that the player can adjust the deviation between the reproduction of the tune and the timing to be instructed by fixing the relationship between the operation and the evaluation in the proper state.

In the present invention, the storage medium includes various storage devices or means such as magnetic storage medium, optical storage medium, magneto-optical storage medium, semi-conductor storage device or the like.

DETAILED DESCRIPTION OF THE PREFERRED EMBODIMENTS

Figure 1:
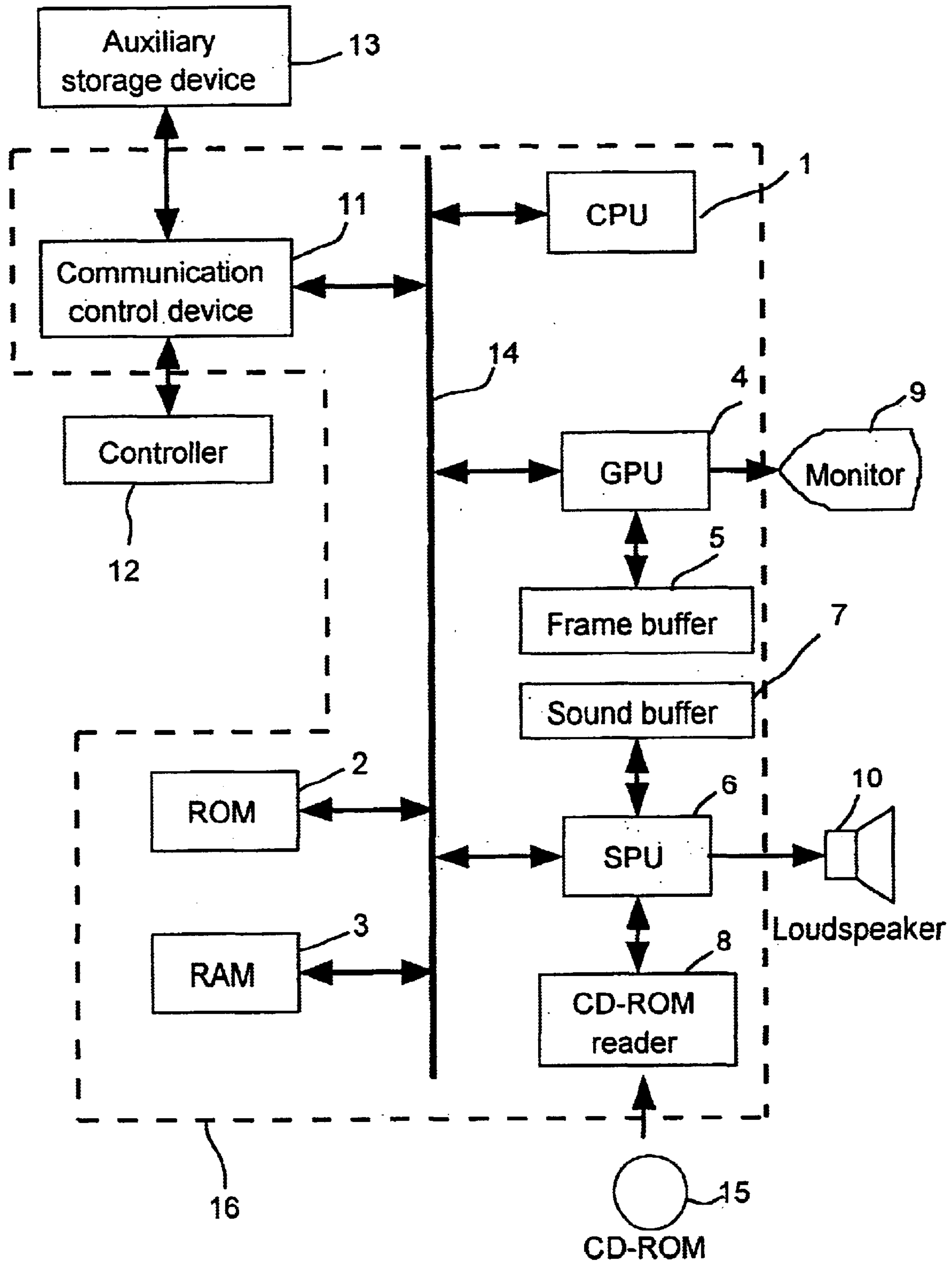
FIG. 1 is a functional block diagram of a household game machine provided as one embodiment of the present invention.

An embodiment in which a present invention is applied to a household game machine will now be described with reference to FIGS. 1 to 5. FIG. 1 is a functional block diagram which serves as an example of a household game machine. This household game machine performs a predetermined game in accordance with a game program stored in a CD-ROM 15 as a storage medium. The game machine comprises a CPU 1 using a microprocessor, a ROM2 and RAM 3 as a main storage device to the CPU 1, a graphics processing unit (GPU) 4 for graphics processing and a sound processing unit (SPU) 6 for sound processing, buffers 5 and 7 for respective units, and a CD-ROM reader 8. The ROM 2 stores an operating system as a program necessary for entire operation control of a game machine. The RAM 3 stores, on demand, a game program or data read out from the CD-ROM 15 as a storage medium. The GPU 4 receives image data from the CPU 1, renders a game picture on the buffer 5, converts the image data into predetermined video reproduction signals, and outputs those signals to a monitor 9. The SPU6 reproduces data of voice, musical sound or the like, data of sound sources and the like which are read out from the CD-ROM 15 and stored in the sound buffer 7, and outputs them from a loudspeaker 10. The CD-ROM reader 8 reads out the program and data recorded on the CD-ROM 15 in accordance with an instruction from the CPU 1, and outputs signals corresponding to the readout contents. On the CD-ROM 15 are stored the program and data necessary for execution of the game. A household television set is used as the monitor 9, and a built-in loudspeaker thereof is used as the loudspeaker 10.

Further, a communication control device 11 is connected via a bus 14 to the CPU 1, and a controller 12 and an auxiliary storage device 13 are detachably connected to the device 11. The controller 12 serves as an input device, and is provided with operation portions to accept operation of a player. The communication control device 11 receives operation signals issued from the controller 12, and outputs signals corresponding to the received signals to the CPU 1. The CPU 1 determines the operation state of the controller 12 based on those signals. A plurality of controllers 12 and auxiliary storage devices 13 can be connected to the communication control device 11 in parallel.

In the above-described structure, elements, except the monitor 9, the loudspeaker 10, the controller 12, the CD-ROM 15 and the auxiliary storage device 13, are integrally housed in a predetermined housing to thereby constitute a game machine main body 16. The game machine main body 16 serves as a computer.

Figure 2:
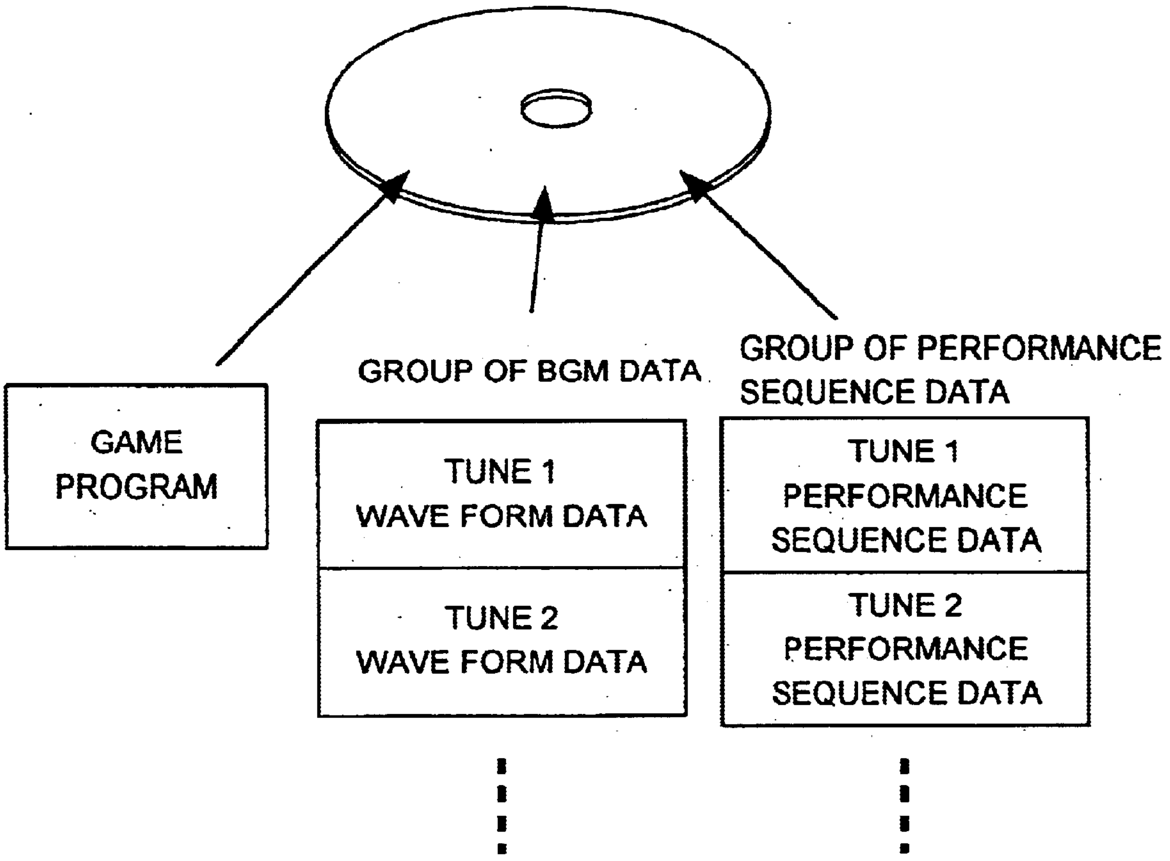
FIG. 2 is a schematic diagram showing a program and data recorded on a CD-ROM as a storage medium.

On the CD-ROM 15, there are recorded a game program and a group of data necessary for execution of the game program. The game to be performed in accordance with the game program on the CD-ROM 15 is a music game in which music as background music (referred to as BGM) is reproduced from the loudspeaker 10, while operation on the controller 12 to be performed in time to the BGM is visually instructed to a player through the monitor 9, and proper sound of a musical instrument or the like is mixed with the BGM if the player operates the controller 12 in accordance with the instruction, thereby allowing the player to experience feeling of performing the musical instrument. To enable the execution of such game, as schematically shown in FIG. 2, there are recorded a group of BGM data and a group of performance sequence data together with the game program.

The group of BGM data is a set of waveform data for each tune (tune 1, tune 2, . . . ) to be reproduced as the BGM from the loudspeaker 10 through the SPU 6. The waveform data for each tune may be recorded in various formats. For example, it can be recoded in the CD-DA format. The group of performance sequence data is a set of performance sequence data prepared to be associated with each tune as the BGM. In short, the performance sequence data is data defining a procedure of operation for each operation portion on the controller 12 in time with the BGM, and corresponds to reference data. In detail, the performance sequence data is data defining which timing each operation portion is to be operated during the reproduction of the tune selected as the BGM. The timing in the tune can be represented by, for example, an elapsed time from a predetermined reference position in the tune, or any parameter corresponding to the elapsed time. The reference position can be set at any position after the play start of the game. For example, a position assumed as a reproduction start position of the tune as the BGM can be determined as the reference position, or any position after the reproduction start, for example, a position at which an overture is ended can be determined as the reference position. A total number of beats from the reference position, when dividing each measure constituting the tune into a predetermined number of beats (for example 32 beats), can be used as the parameter corresponding to the elapsed time.

Various data, except the above data, are recorded on the CD-ROM 15. For example, if it is allowed to generate a sound effect in response to operation of a player, data designating which sound effect should be generated corresponding to each operation is recorded. The data may designate the sound effect for each operation portion on the controller 12 for every adequate end in the tune, or designate the sound effect individually for each operation defined in the performance sequence data. Then, in the case of generating the sound effect, waveform data to reproduce the sound effect from the loudspeaker 10 though the SPU 10 are recorded on the CD-ROM 15. Such data can be prepared, for example, as PCM data encoded at the same sampling frequency as that of the data for reproducing the BGM.

Figure 3:
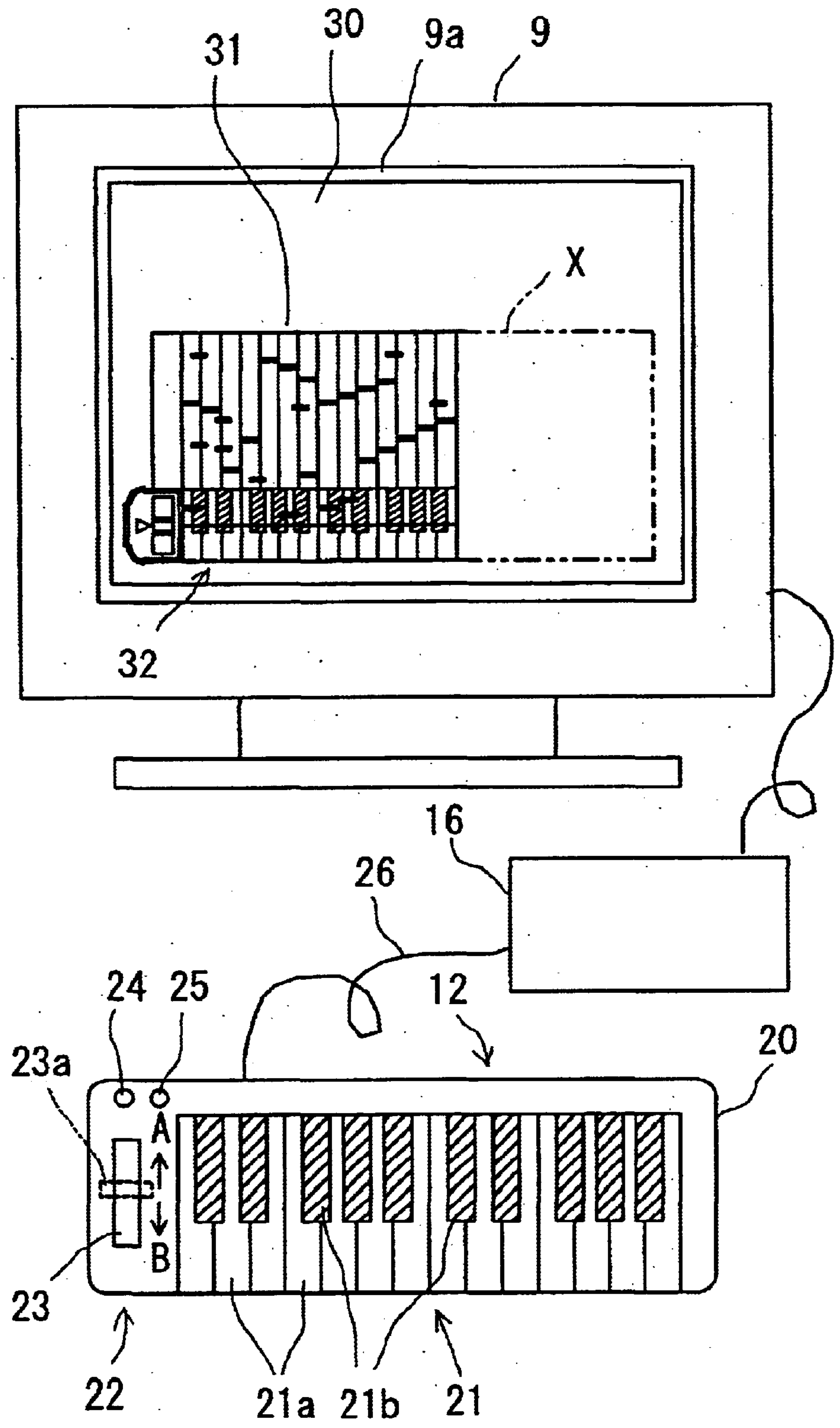
FIG. 3 is a diagram showing a state in which a controller and a monitor are connected to a game main body in FIG. 1.

FIG. 3 shows a state in which the controller 12 and the monitor 9 are connected to the game machine main body 16. The controller 12 is an exclusive controller designed for the above described music game, and in this embodiment configured to imitate a keyboard instrument. Of course, the controller 12 is not limited to one imitating the keyboard instrument, but it can imitate various musical instruments (for example, a drum set, a guitar or the like). The controller may imitate an input device besides the musical instrument, and a game pad that is generally used in the household game machine may be used as the controller 12. The controller 12 may detect stepping motions by foot, or a non-contact type detection device utilizing an infrared ray or the like can be used as the controller 12.

The controller 12 shown in FIG. 3 comprises a housing 20, for example made of resin, and the housing 20 is provided with a keyboard portion 21, a wheel portion 22, and push button switches 24 and 25. A true keyboard instrument is diverted to the keyboard portion 21, and the portion 21 has fourteen white keys 21*a* . . . 21*a* and ten black keys 21*b* . . . 21*b* corresponding to two octaves. These are capable of being depressed like those of the musical instruments. For example, it is possible to use a MIDI keyboard as the keyboard portion 21, and the CPU 1 can distinguish operation of each key using the MIDI signals output therefrom.

The wheel portion 22 comprises a wheel 23 rotatably operable about a rotation shaft 23*a* extending in a right-and-left direction in FIG. 3. The rotation shaft 23*a* is arranged in the housing 20, so that at least a lower half of the wheel 23 is accommodated in the housing 20. A player (operator) can rotatably operate the wheel 23 in a front-and-rear direction (directions indicated by arrows A and B in FIG. 3) with putting a finger on an upper surface thereof. The white keys 21*a*, the black keys 21*b* and the wheel 23 are provided as operation portions used in a game play. Also, the push button switches 24 and 25 are provided as operation portions through which a start, an interruption or the like is instructed. The controller 12 transmits signals associated with operation states of these white keys 21*a*, black keys 21*b*, wheel 23 and push button switches 24 and 24 through a signal conductor 26 to the game machine main body 16. With respect to the white keys 21*a* and black keys 21*b*, signals indicating a key stroke and a key release are output, while signals indicating a rotation amount and a rotation direction are output with respect to the wheel 23.

During a game play to be executed in accordance with the game program recorded on the CD-ROM 15, a game picture 30 is displayed on a screen 9*a* of the monitor 9. In the game picture 30, there is included an operation instruction picture 31 for instructing operation of the controller 12. As shown in phantom line X in FIG. 3, the width of the operation instruction picture 31 can be adjusted in the right-and-left direction. The view of the operation instruction picture 31 is shown in FIG. 4.

Figure 4:
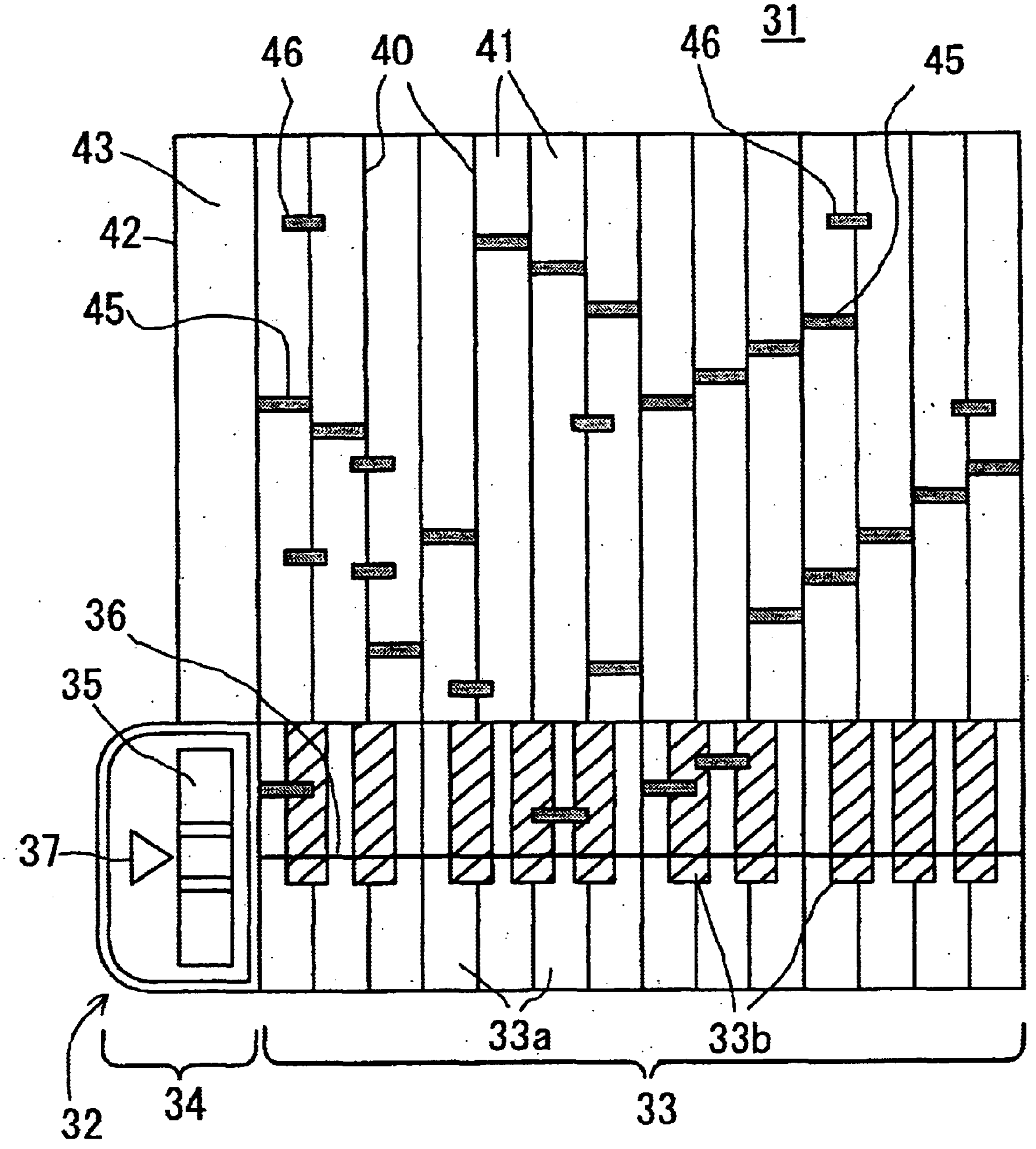
FIG. 4 is a diagram showing an operation instruction picture to be displayed in a game picture of FIG. 3.

As is apparent from FIG. 4, in a lower portion of the operation instruction picture 31, there is provided a controller picture 32 having a correspondence relationship to the controller 12 as an input device. The controller picture 32 includes a keyboard picture 33 corresponding to the keyboard portion 21 of the controller 12 and a wheel picture 34 corresponding to the wheel portion 22. The keyboard picture 33 includes virtual white keys 33*a* and black keys 33*b* corresponding to the white keys 21*a* and black keys 21*b* of the actual keyboard potion 21, respectively. Also, the wheel picture 34 includes a virtual wheel 35 corresponding to the actual wheel 23. With respect to a correspondence relationship between these pictures and the respective portions of the actual keyboard portion 21 in external views thereof, it is not necessary to keep complete sameness therebetween, and it is acceptable to maintain the sameness at a level at which a player can grasp a correspondence relationship between the operation portions of the controller 12 and the operation portions in the controller picture 32 at a first sight. For example, it may possible to allow the player to distinguish the correspondence relationship between the controller 12 and the controller picture 32 by providing sameness with respect to a configuration or color of each operation portion, or providing sameness with respect to a letter or a mark attached to each operation portion.

In the controller picture 32, there is displayed a reference line 36 traversing the keyboard picture 33 in its right-and-left direction (key arrangement direction), and a reference mark 37 is displayed beside the wheel picture 34 with its position being coincided with the reference line 36 in a vertical direction. These reference line 36 and the reference mark 37 serve as reference signs for indicating an operation time of the controller 12.

Above the keyboard picture 33, there are displayed partition lines 40 . . . 40 extending in the vertical direction to accord with boundary positions of the white keys 33*a*. By these partition lines 40, there are provided areas 41 . . . 41 of the same numbers as those of the white keys 33*a* above the keyboard picture 33 in the operation instruction picture 31. Also, above the wheel picture 35, there are displayed partition lines 42 to thereby provide an area 43. Accordingly, the areas 41 . . . 41 correspond to the actual white keys 21*a* . . . 21*a* with a one-to-one relationship through the virtual white keys 33*a* . . . 33*a*, while the area 43 corresponds to the actual wheel 23 through the virtual wheel 35. Further, the partition lines 40 . . . 40 correspond to the virtual black keys 33*b* . . . 33*b* with a one-to-one relationship.

In each area 41, there are displayed objects 45 . . . 45 as movable signs, which are flat in the right-and-left direction, and on the partition lines 40 (but only on lines overlapping the black keys) are displayed the similar objects 46. The similar object is displayed in the area 43, but its illustration is omitted in FIG. 4. Each of the objects 45 and 46 appears in the upper end of the operation instruction picture 31, and goes down at a speed in compliance with a tempo of the tune as the BGM. Then, through the coincidence of the object 45 or 46 and the reference line 36, the player is informed of operation timing of the white key 21*a* or the black key 21*b* as the operation portion corresponding to the area 41 or the partition line 40, in or on which each of the objects 45 and 46 are displayed. Namely, the player is requested to operate the white key 21*a* or the black key 21*b* associated with the display position of the object 45 or 46 (the area 41 or the partition line 40) a the time that the object 45 or 46 coincides with the reference line 36.

As is discussed in the above, the operation timing is defined by the performance sequence data. Accordingly, the above described display of the objects 45 and 46 can be carried out by executing a process referred to as the scroll process, in which the steps of reading out the performance sequence data with shifting the readout range from the head of the data by a predetermined amount at certain intervals while determining a predetermined time in the game as a starting point, and of calculating coordinates of the objects 45 and 46 to be displayed in the picture 31 based on the read performance sequence data are repeated.

In the above described scroll process, the display positions of the each of the objects 45 and 46 are basically controlled so as to coincide the operation timing of each operation portion defined in the performance sequence data with the operation timing guided through the coincidence of the object 45 or 46 and the reference line 36. However, if an adjustment value is set through an adjustment value setting process which will be described later, a deviation according to the adjustment value is set between the operation timing guided through the coincidence of the object 45 or 46 and the reference line 36 and the operation timing defined in the performance sequence data. Hereinafter, this point will be explained with referring to FIG. 5.

Figure 5:
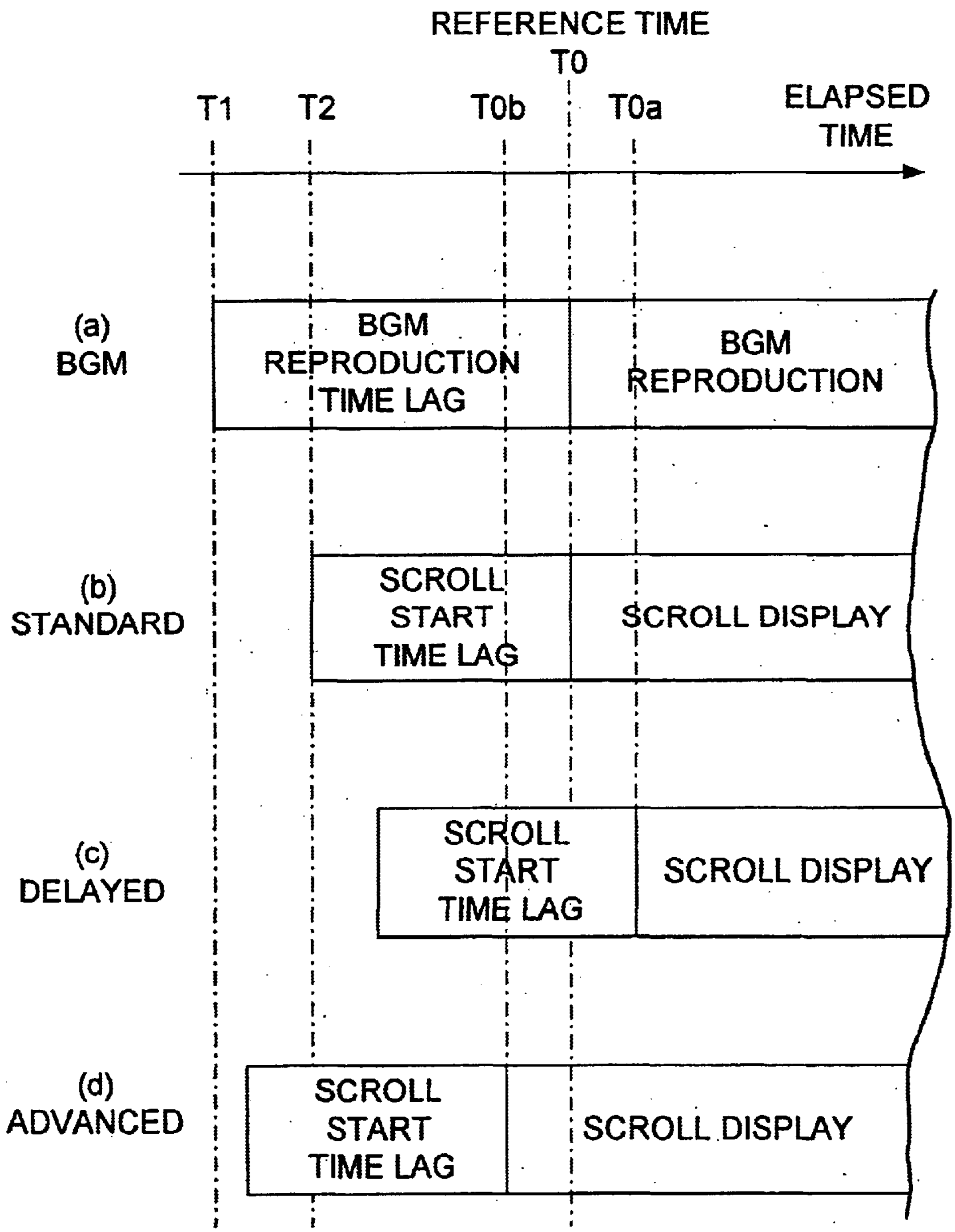
FIG. 5 is a diagram showing a relationship between timing of starting reproduction of a tune and timing of starting a scroll process to be executed for performing operation guidance.

FIG. 5 is a diagram showing a time relationship between the reproduction of the BGM and the scroll process for the objects. There is a time lag from the time when the CPU 1 of the game machine instructs a start of the reproduction of the BGM until the BGM is actually reproduced through the loudspeaker 10. In FIG. 5(*a*), it is assumed that the time when the BGM is actually reproduced is considered as a reference time T0, and that the CPU 1 instructs the reproduction of the BGM at the time T1 obtained by going back to the past from the time T0 by an interval corresponding to the time lag necessary for executing the reproduction of the BGM. With respect to the scroll process, there is also a time lag from the time when the CPU 1 starts the process until the scrolling display is actually started in the picture 31. In general, the time lag with respect to the scroll process does not accord to the time lag with respect to the reproduction of the BGM.

As described in the above, the performance sequence data is originally prepared to define what operation should be done at which position in the tune, and the evaluation of the player's operation is carried out based on the performance sequence data. Therefore, the scroll of the objects should be exactly synchronized to the BGM. For example, in the case where the reproduction start time of the BGM is set as the reference position and the operation timing is defined by the elapsed time from the reference position or the parameter corresponding to the elapsed time in the performance sequence data, if the time when the scrolling display is started does not accord to the production start time T0 of the BGM, the timing instructed to the player through the scrolling display is deviated from the position in the tune defined in the performance sequence data as the operation timing, so that the exact timing cannot be instructed to the player.

Therefore, as shown in FIG. 5(*b*), it is necessary to determine the time T2 of starting of the scroll process in such a manner that the time when the scrolling display is started coincides with the reproduction start time T0 of the BGM. However, it is difficult to perfectly accord the timings with each other. Therefore, in the step of developing the software, the BGM is considered as a reference, and the timing to instruct the start of the reproduction of the BGM and the timing of starting the scrolling display are adjusted so as to obtain a feeling that the operation is instructed at the most suitable timing. Accordingly, the timing when the reproduction of the BGM is started and the timing when the scrolling display is started are not always in accord with each other. However, it is herein assumed that both of the reproduction of the BGM and the scrolling display are started at the entirely same time T0 when in a standard setting.

Incidentally, it is not necessary to always coincide the time of starting the scrolling display with the reproduction start time of the BGM. It may be acceptable to start the scrolling display at the predetermined position in the BGM (for example, end position of an overture part). However, it is herein assumed that the reproduction start time is considered as the reference time T0 and the scrolling display is started at that time for the sake of convenience.

Figure 6:
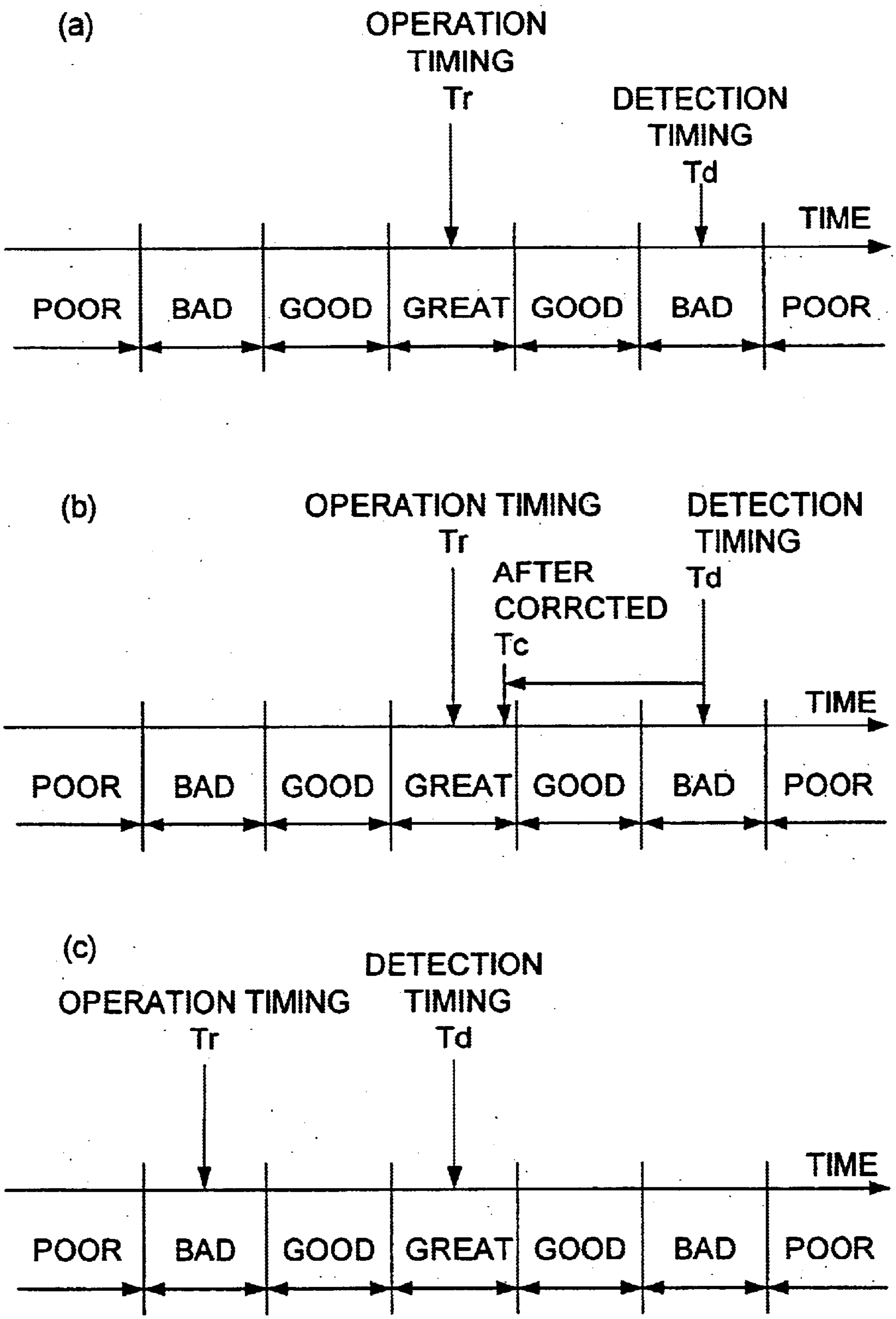
FIG. 6 is a diagram showing a way of operation evaluation by the game machine of FIG. 1.

On the other hand, in the game program, an evaluation process is prepared in which operation of the player is evaluated based on the performance sequence data, besides the above described scroll process. That process is executed as shown in FIG. 6(*a*).

Hereinafter, in one example, the time Tr after predetermined seconds from the above described reference time T0 is defined in the performance sequence data as an operation time for any operation portion (for example, the white key 21*a* on the right end), and the operation is instructed to the player in such a manner that the object 45 corresponding to the right end white key 21*a* reaches the reference line 36 at the time Tr through the above described scroll process (however, the adjustment values is not set). Further in the example, it is assumed that the player operates the right end white key 21*a* in response to the instruction of the operation timing, and that operation is detected at time Td.

In the evaluation program, evaluation ranges are set before and after the operation time Tr. For example, in the case of FIG. 6(*a*), one range having a center on the position of the operation time Tr is set as a range giving the evaluation of "GREAT", and outward therefrom ranges are set giving the evaluation of "GOOD", and further outward therefrom are set ranges giving the evaluation of "BAD", and still further outside therefrom ranges are set giving the evaluation of "POOR", respectively. When the operation with respect to the right end white key 21*a* is detected, the CPU 1 determines which one of the above described ranges the detected timing Td is included in, and giving points associated with the range including the detected timing Td. At this time, the points are decreased as the timing Td deviates from the timing Tr. Namely, the evaluation is lowered as the timing Td when the operation is actually detected deviates from the operation timing Tr defined in the performance sequence data. Incidentally, in the case where the player operates the white key 21*a*, the black key 21*b*, or the wheel 23, there is a time lag from the time when the operation is actually performed until the CPU 1 actually detects the operation. Accordingly, in order to determine the deviation amount between the operation timing Tr on the performance sequence data and the detected timing Td, it is necessary to consider the time lag of the detection. However, it is herein assumed that the time lag has not occurred, or the detected timing Td itself indicates the time having been corrected with taking the time lag into account.

As described in the above, the reproduction of the BGM, the operation instruction based on the performance sequence data and the operation evaluation based on the same data are associated with each other. However, the mutual relationship among these can be affected by various elements, so that a subtle deviation may occur among them. If such deviation occurs, there is a possibility that the timing of instructing the operation to the player deviates from the original position in the BGM, or the evaluation is lowered even though the player performs the operation so as to exactly follow the instruction of the operation, thereby causing a feeling of inaccuracy. Also, even though the above mutual relationship is properly adjusted in the household game machine itself, there may be provided another game machine (for example, an arcade-type game machine) having a hardware configuration different from that of the household game machine, while the contents of the game is the same as those executed on the household game machine. In such case, the above mutual relationship in the arcade-type game machine may differ from that of the household game machine, so that the player skilled in the play on the arcade-type game machine cannot obtain higher evaluation when playing the same tune on the household game machine, thereby also causing a feeling of inaccuracy.

Further, in the case where the responsiveness of the controller 12 is inferior to an input device of the arcade-type game machine, that is, the timing of issuing the detection signals in response to the operation on the white key 21*a* or the black key 21*b* may be slow in comparison with that of the arcade-type game machine, the same problem may occur. In such case, if the player skilled in the play on the arcade-type game machine plays the game on the household game machine, the operation by the player is detected by the game machine at the time later than the time when the player feels that the operation is detected, even if the timing of instructing the operation in the household game machine has properly been adjusted by the designer of the software so as to be matched with the timing in the arcade-type game machine. Therefore, the evaluation is deviated, even if the player believes to have exactly followed the operation instruction given from the game machine.

Figure 7:
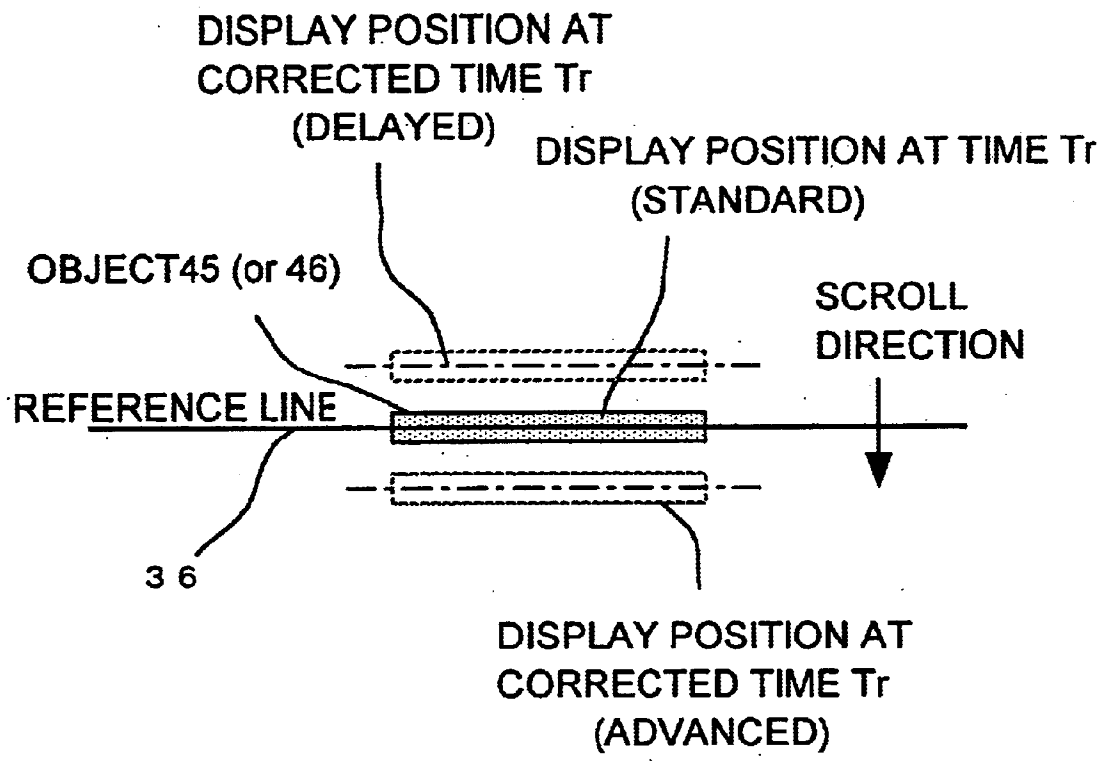
FIG. 7 is a diagram showing a positional deviation of an object when varying start time of the scroll process.

Therefore, in the game system of this embodiment, the player is allowed to adjust the timing of starting the scroll process, thereby enabling adjustment of the timing when the objects 45 and 46 coincide with the reference line 36 in the game picture. FIG. 5(*c*) shows an example in which the timing of starting the scroll process is delayed, and FIG. 5(*d*) shows an example in which the timing of starting the scroll process is advanced, respectively. In such case of varying the timing of starting the scroll process, the display positions of the objects 45 and 46 are shifted to upper or lower side from the positions when in the standard state. Namely, as shown in FIG. 7, in the case where the object 45 (or 46) coincides with the reference line 36 at the time Tr after the predetermined seconds from the reference time T2 when in the standard state, the object 45 deviates upward the reference line 36 at the time Tr if the timing of starting the scroll process is delayed, while the object 45 deviates downward from the reference line 36 at the time Tr if the timing of starting the scroll process is advanced. Thus, it is possible to adjust the timing of the operation to be instructed to the player based on the performance sequence data.

Incidentally, it is necessary to take notice that the scroll process and the operation evaluation process are performed in accordance with the different reference times, respectively, when varying the start time of the scroll process as shown in FIG. 5. That is, in the scroll process, it is supposed that the time T0*a* (or T0*b*) having been corrected is considered as the reproduction start time of the BGM, the elapsed time or the parameter corresponding thereto is counted up with the corrected time being as the reference, and the display positions of the objects 45 and 46 are successively updated in accordance with the counted value from the corrected time T0*a* or T0*b* On the contrary thereto, in the process for evaluating the operation, the elapsed time from the start of the reproduction of the BGM or the parameter corresponding to the elapsed time is counted up with the reference time T0, which is originally intended to be the reproduction start time of the BGM, being as the reference point, regardless of the deviation of the time when the scroll process is started, and the operation timing on the performance sequence data and the timing when the operation is actually performed are specified in accordance with the counted value from the time T0.

As described in the above, by shifting the display positions of the objects 45 and 46 upward or downward through the adjustment of the star time of the scroll process, there is generated a deviation in the mutual relationship among the reproduction of the BGM, the operation instruction based on the performance sequence data and the operation evaluation based on the same data. Therefore, when the player has feeling of inaccuracy to that relationship, it is possible to adjust the relationship to the state which seems to be the most suitable for the player him or herself. For example, if the player has the feeling that the operation timing instructed by the coincidence of the objects 45 and 46 and the reference line 36 is advanced in comparison with the experience of playing the same tune by the arcade-type game machine, such player can solve or reduce the feeling of inaccuracy by adjusting the start time of the scroll process so as to be delayed from the standard time.

Figure 8:
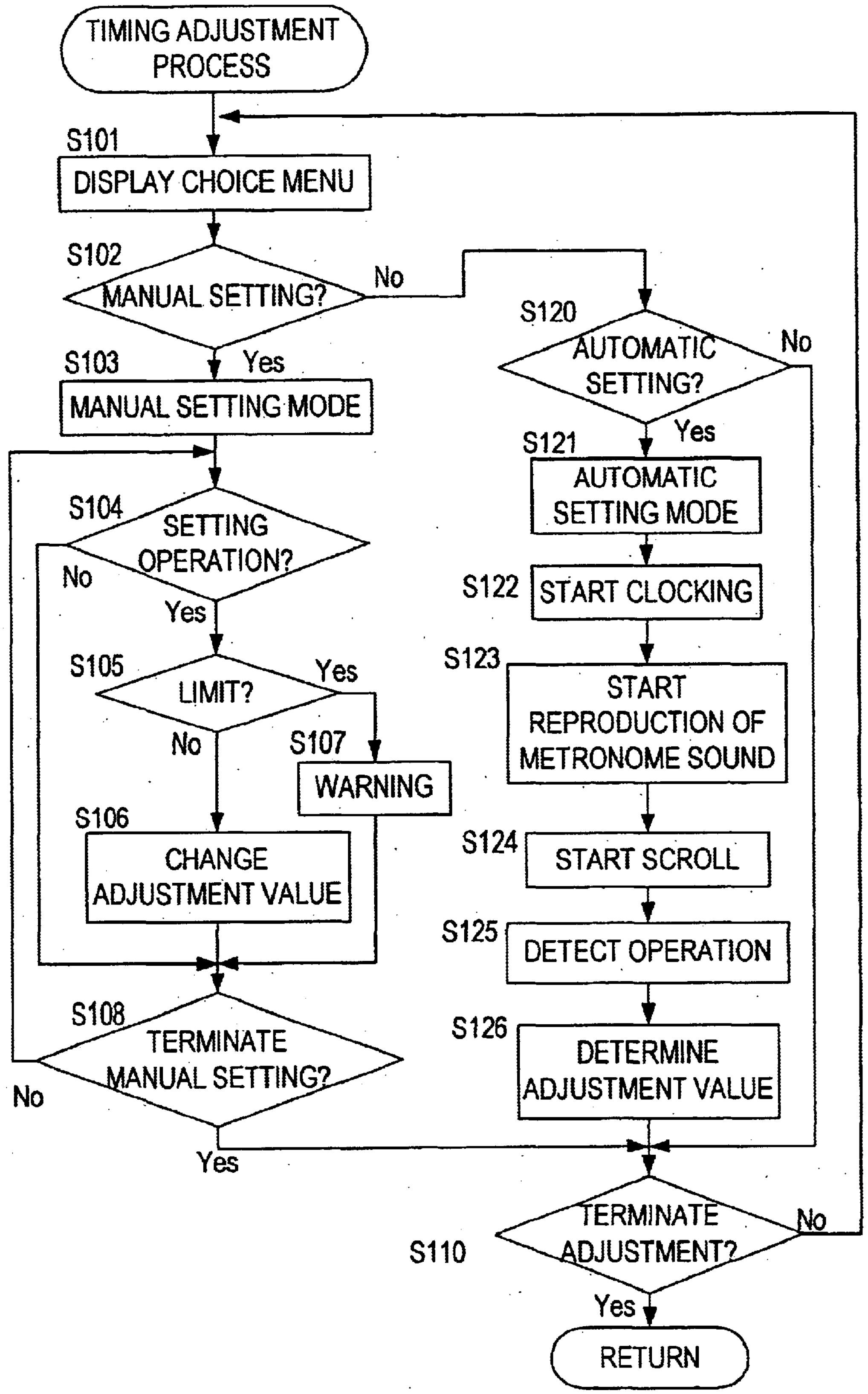
FIG. 8 is a flowchart showing a procedure to be executed for setting an adjustment value.
Figure 9:
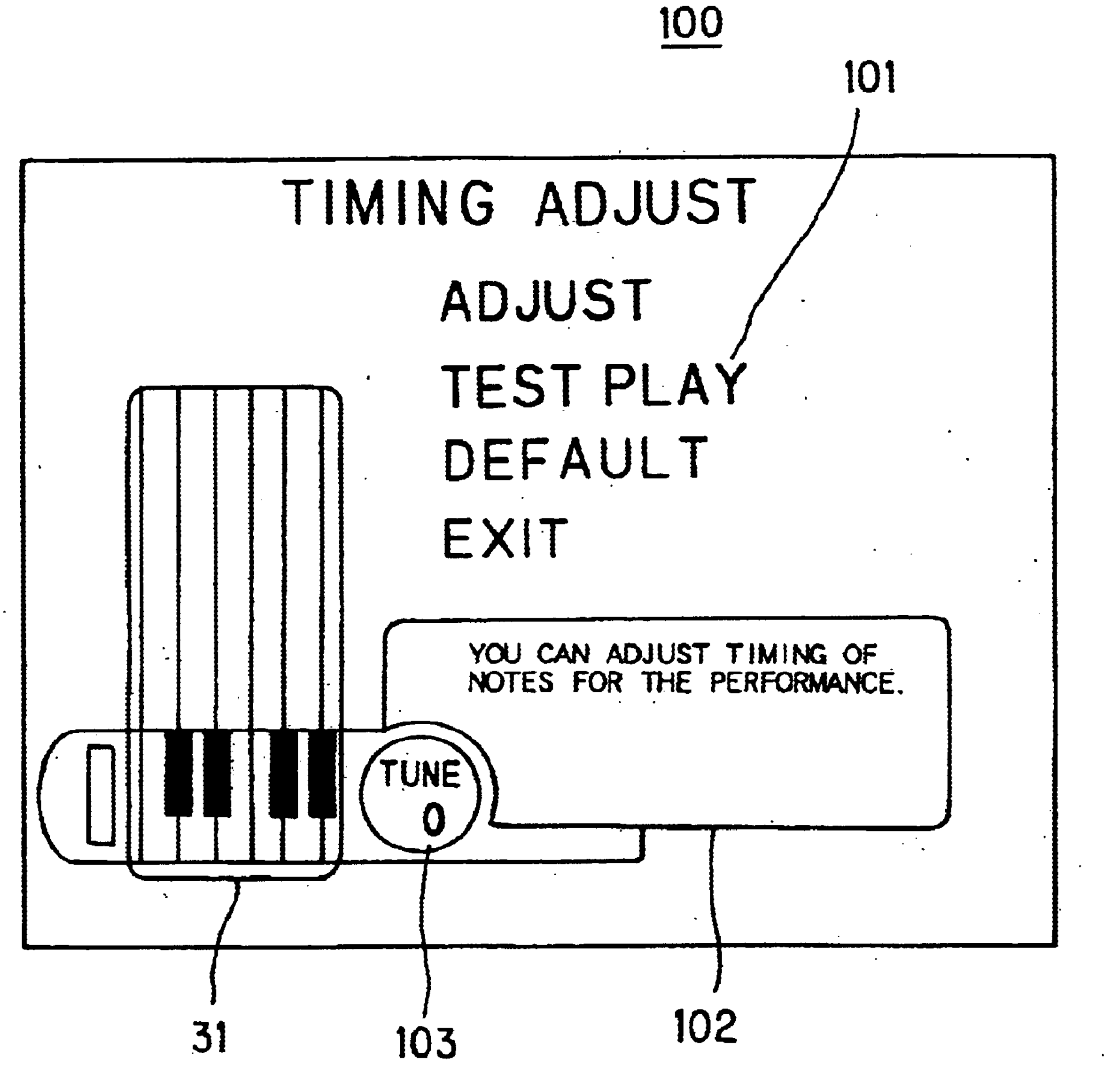
FIG. 9 is a view showing a picture to be displayed on a screen of a monitor when the process of FIG. 8 is executed.
Figure 10:
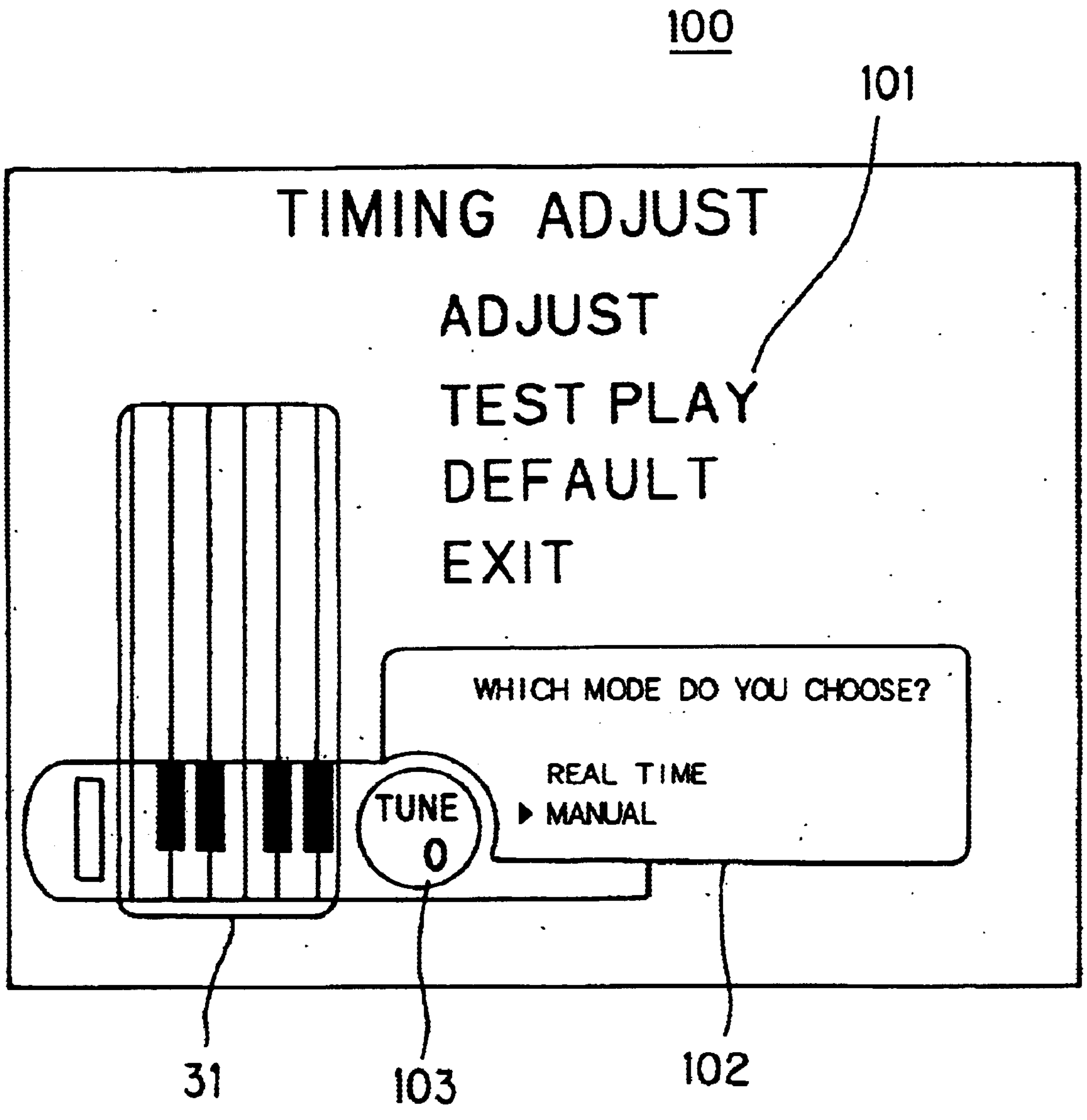
FIG. 10 is a view showing a display example when an "ADJUST" is selected in a picture of FIG. 9.

FIG. 8 is a flowchart showing the timing adjusting process to be executed by the CPU 1 for setting the adjustment value described in the above, and FIGS. 9 to 12 are examples of pictures displayed on the monitor 9 during that process. FIG. 9 shows the timing adjustment picture 100 displayed on the monitor 9. In the game described hereinafter, an optional setting is prepared as one item in a main menu to be displayed in the start of the game or the like, and a timing adjustment process is prepared as a sub-item in the optional setting. When the player selects the timing adjustment process by operating the controller 12 and subsequently performs a determination operation, the picture 100 is displayed. In the timing adjustment picture 100, a part of the operation instruction picture 31 is displayed to be highlighted, and there are included a choice item display position 101, an instruction display portion 102 and an adjustment value display portion 103. The process shown in FIG. 8 is started when the player chooses the item of "ADJUST" in the choice item display portion 101 in the picture 100 and performs the determination operation.

Figure 11:
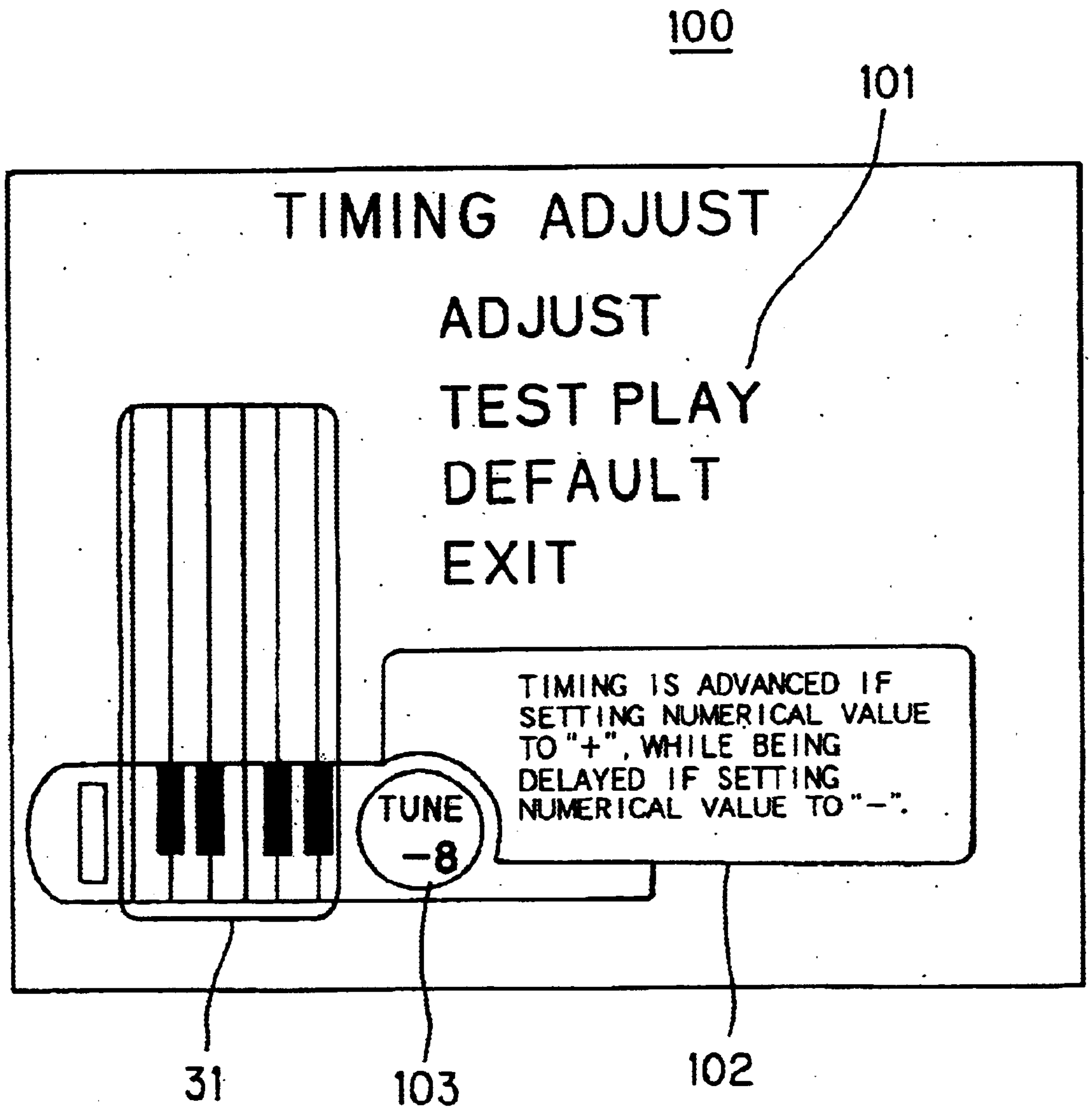
FIG. 11 is a view showing a display example of FIG. 9 when entering a manual setting mode in accordance with the process of FIG. 8.

In the process of FIG. 8, at the first Step S101, a choice menu is displayed in the operation instruction portion 102. In the choice menu, there are included choice items of "REAL TIME" which means an automatic setting of the adjustment value, and "MANUAL" which means a manual setting of the adjustment value. At step S102, it is judged whether or not the player chooses the item of "MANUAL", and if an affirmative judgment is done, then it is considered that the manual setting is chosen, so that the process is advanced to step S103, thereby entering a manual setting mode and a display of the picture 100 being changed as shown in FIG. 11.

After entering the manual setting mode, first of all, it is judged whether or not a predetermined setting operation is performed on the controller 12 (step S104). The setting operation can be defined properly, but in this case, rotational operation of the wheel 23 is defined as the setting operation. The adjustment value increases when the wheel 23 is rotated in one direction (for example, the direction indicated by an arrow A in FIG. 3), while decreasing when the wheel 23 is rotated in a counter direction (for example, the direction indicated by an arrow B in FIG. 3. When the adjustment value is not set (this means the standard state in FIG. 5(*b*)), the value is considered as 0. When the adjustment value is a positive number, the timing of starting the scroll process is advance, while the timing of starting the scroll process is delayed when the adjustment value is a negative number. The current value of the adjustment value is displayed numerically in the adjustment value display portion 103. The adjustment value increases or decreases one by one as the wheel 23 is rotated by a predetermined unit amount.

The minimum unit for adjusting the timing is, for example set to 1/75 seconds, and the increase or decrease of the adjustment value by one unit means that the start timing of the scroll process is shifted by the minimum unit. There are defined an upper limit and lower limit for the adjustment value, for example, +10 is set as the upper limit while −10 is set as the lower limit. The reason for defining such limits is that, if the display positions of the objects 45 and 46 are excessively deviated, there would be a problem that the deviation between the timing when the objects 45 and 46 coincide with the reference line 36 and the musical beats of the BGM becomes remarkable to thereby cause an unnatural feeling.

At subsequent step S105, it is judged whether or not the adjustment value reaches the upper or lower limit, and if it does not reach such value, then the adjustment value is changed in accordance with the adjustment value setting operation (step S106). If it reaches the upper or lower limit, the warning is performed to the player (step S107). It may be acceptable to merely ignore the adjustment value setting operation instead of setting the warning. At step S108 following those steps, it is judged whether or not the player performs a termination operation for the manual setting mode, and if a negative judgment is made, the process returns to step S104. If an affirmative judgment is made at step S108, then it is judged whether or not the player performs a termination operation for the timing adjustment (step S109). If a negative judgment is made, then the process returns to step S101, while the process of FIG. 8 is terminated when an affirmative judgment is made at step S110.

Figure 12:
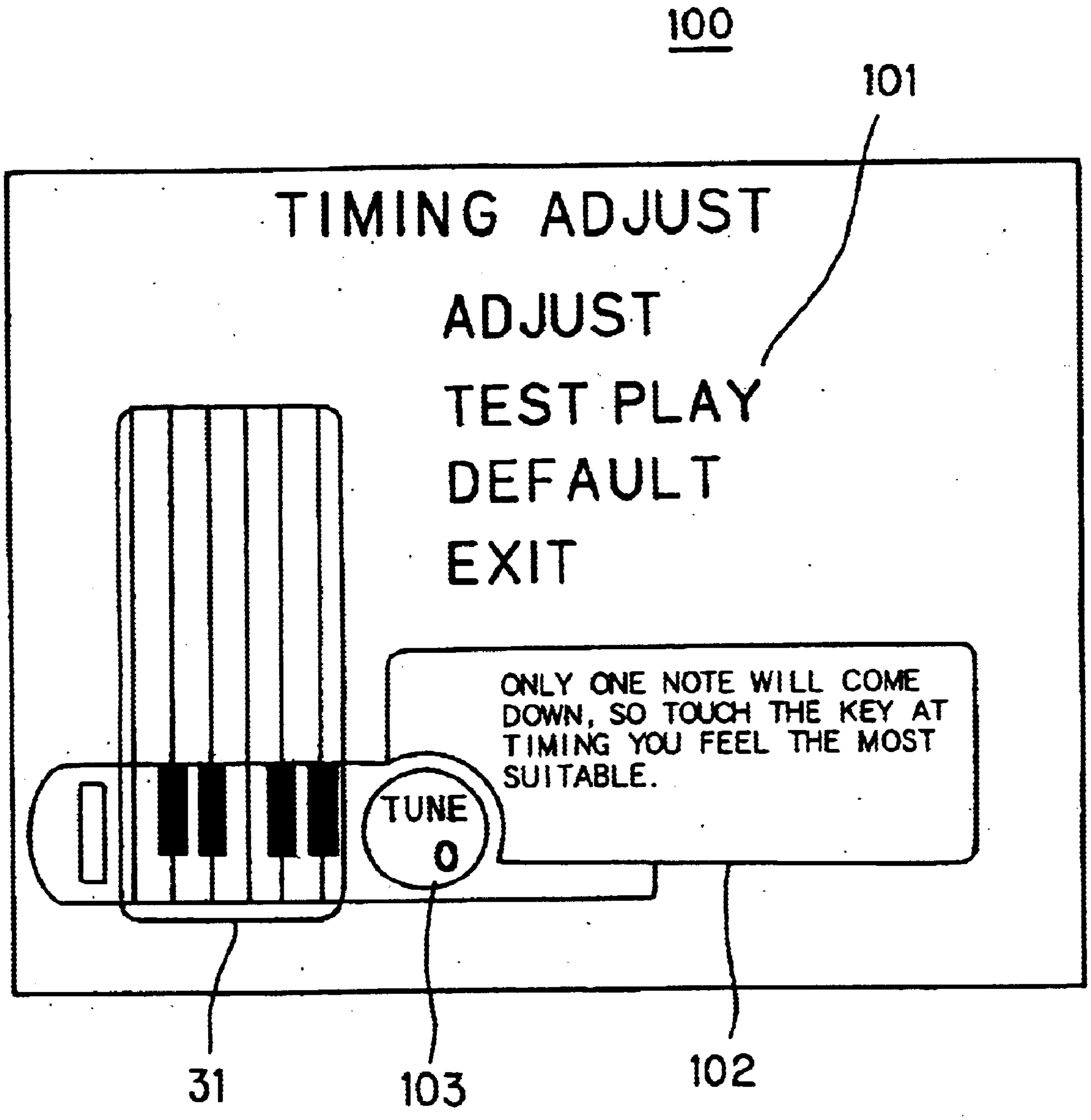
FIG. 12 is a view showing a display example of FIG. 9 when entering an automatic setting mode in accordance with the process of FIG. 8.

If a negative judgment is made at step S102, the process advances to step S120, and it is judged whether or not the item of “REAL TIME” is chosen. If an affirmative judgment is made, it is considered that the automatic setting is chosen and then the process advances to step S121, entering the automatic setting mode with the display of the picture 31 being changed as shown in FIG. 12. After entering the automatic setting mode, first of all, clocking is started to grasp the amount of deviation of the operation timing (step S122), and then reproduction of metronome sound is started at a predetermined beat number (step S123), and further a process to scroll one object 45 from the top end to the low end of the operation instruction picture 31 at a speed synchronized with the metronome sound (step S124). Next, operation is detected with respect to the white key 21 a corresponding to the area in which the object 45 is displayed (step S125). Next, the adjustment value is determined based on the elapsed time from the start of clocking until the operation is detected (step S126). The adjustment value can be determined, for example, by the steps of: assuming that the operation is performed at the most suitable timing when the object 45 coincides with the reference line 36, determining the elapsed time Tx from the start of clocking at step S122 until the most suitable operation is detected as a standard value at the software designer’s side, and detecting at step S126 the elapsed time Tx' from the start of clocking until the operation is actually detected. After the above steps, the adjustment value can be determined based on the amount and the direction (positive or negative) of the deviation of the actual detected value Tx' to the standard value Tx. Of course, the adjustment value increases in the positive side as the deviation amount increases in the positive side, while the adjustment value decreases in the negative side as the deviation amount decreases in the positive side. However, the upper and lower limit are defined with respect to the deviation amount, so that the adjustment value is set to its upper or lower limit when the deviation amount exceeds its limit. After determining the adjusting value at step S126, the process advances to step S110. The adjustment value determined through the above processes is stored in a predetermined area in the RAM 3, and also stored in the auxiliary storage device 13 in accordance with the player’s operation.

Incidentally, in the above process, only one object 45 is scrolled to determine the adjustment value, but it may possible to determine the adjustment value by repeating the same process. In this case, it is possible to determine a central value (for example, a mean, a mode, or a median), which can be obtained by processing the adjustment values corresponding to each object 45 through the statistical method, as a final adjusting value.

Figure 13:
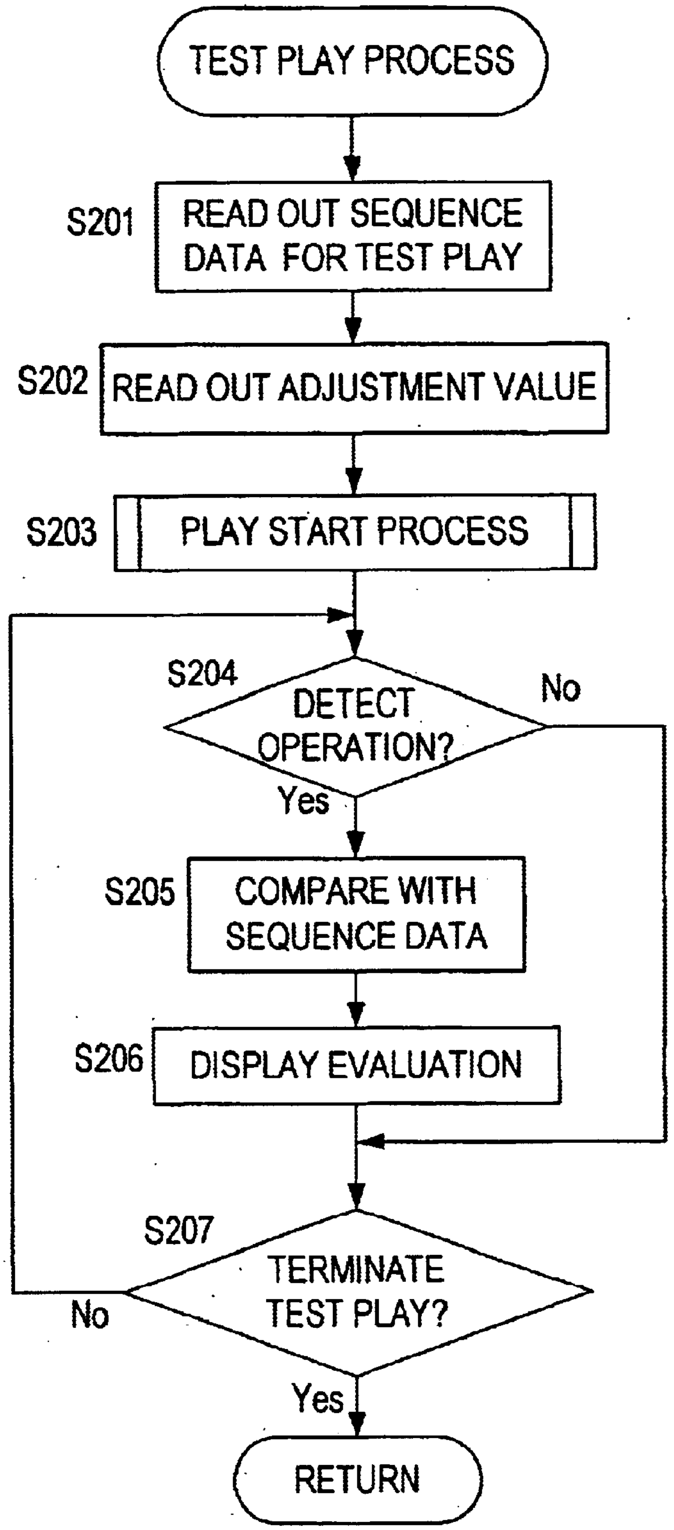
FIG. 13 is a flowchart showing a procedure to be executed when a test play is performed.
Figure 15:
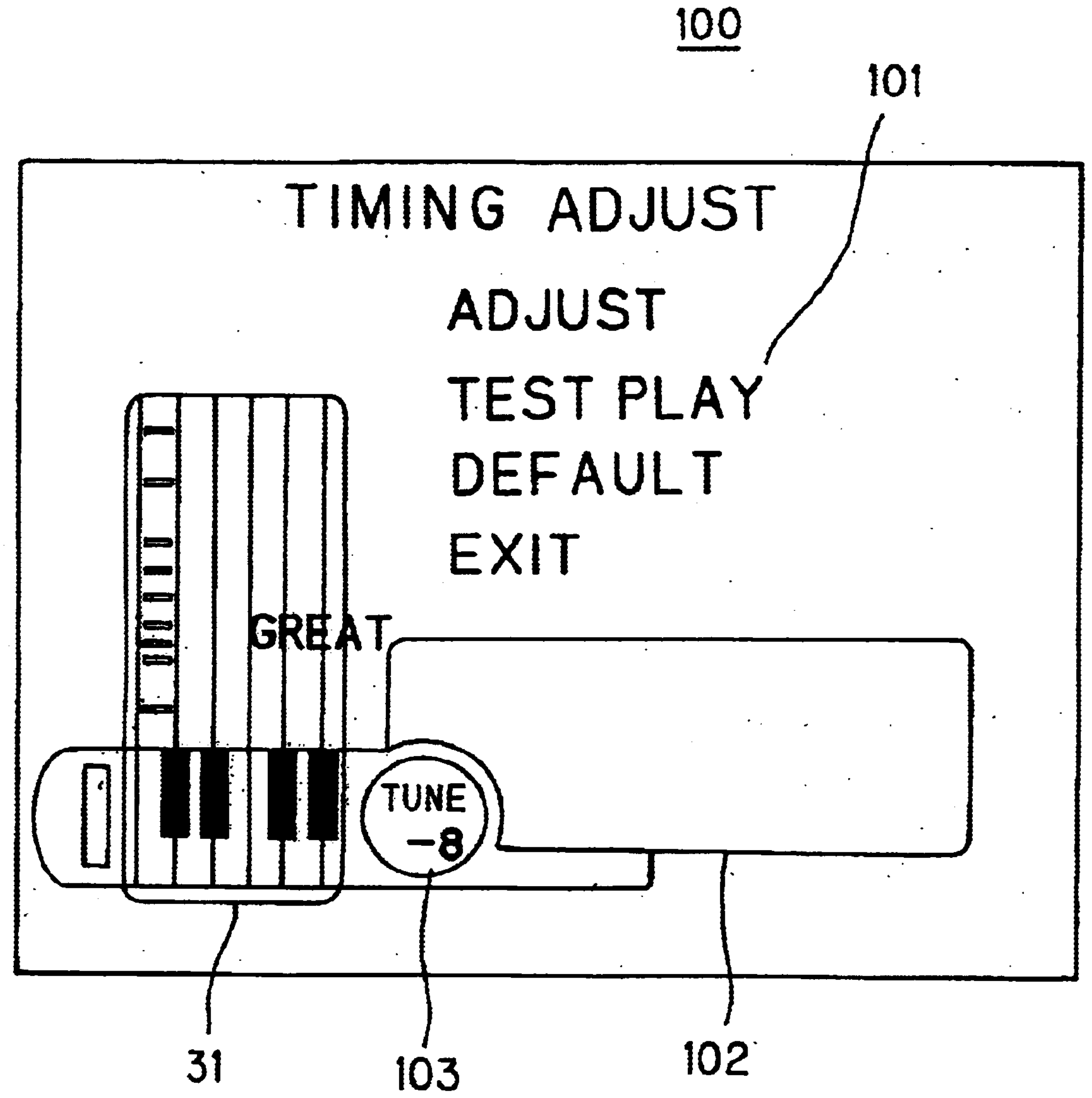
FIG. 15 is a view showing a display example of a picture to be displayed when in the test play.

After finishing the process of FIG. 8, the picture 100 returns to the state shown in FIG. 9. If the player chooses the item of “TEST” in the choice item display portion 101 and then performs the determination operation, a test play shown in FIG. 13 is started. In the test play process, a plurality of objects 45 are displayed to be scrolled in one area 41 as shown in FIG. 15 likewise the actual game play, and the player is allowed to confirm whether or not the timing adjustment is properly carried out by operating the white key 21*a* in time with the scrolled objects 45.

After starting the process of FIG. 13, first of all, the performance sequence data to be used in the test play is read out from the CD-ROM 15 (step S201). The performance sequence data for the test play can be obtained by sampling the operation timings associated with the area 41 to be used in the test play. After reading out the performance sequence data, the adjusting value is read out from the RAM 13. Incidentally, in the case where the adjusting value stored in the auxiliary storage device 13 is used, it is necessary to send the adjustment value from the auxiliary storage device 13 to the predetermined are in the RAM 3 in advance.

At subsequent step S203, the play start process is executed. By the play start process, the reproduction of the BGM and the scroll process are started. At subsequent step S204, it is judged whether or not the operation of the player is detected, and if it is detected, the operation is evaluated by comparing the timing of the detected operation and the operating timing defined by the performance sequence data (for the test play) with each other. This evaluation process is already explained with referring FIG. 6(*a*). At next step S206, the result of the evaluation is displayed. In this case, letters corresponding to the evaluated level, that is, letters of “GREAT”, “GOOD”, “BAD” or “POOR” shown in FIG. 6(*a*) are displayed to notify the player which level the operation is evaluated. Incidentally, FIG. 15 shows a display example when the operation is evaluated as “GREAT”.

After displaying the evaluation, it is judged whether or not the test play is to be terminated (step S207), and if it is judged as not to be terminated, the process returns to step S204. If the operation is not detected at step S204, steps S205 and S206 are skipped. If it is judged that the test play is to be terminated at step S207, then the test play is terminated.

Figure 14:
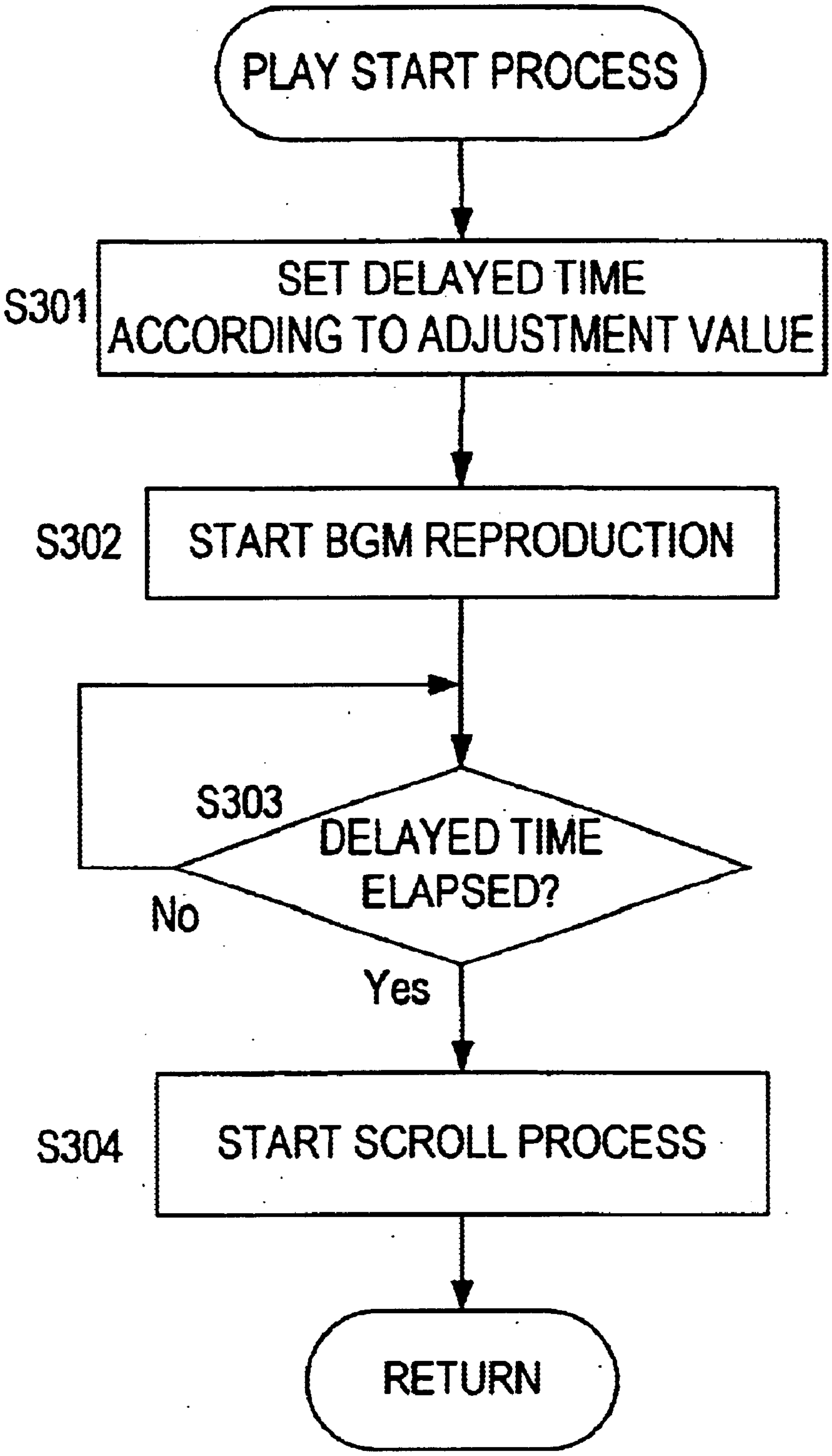
FIG. 14 is a flowchart showing a procedure of a play start process to be executed as a sub-routine depending on processes of FIGS. 13 and 16.

FIG. 14 shows a play start process to be executed as a sub-routine process of step S203. In the play start process, first of all, a delay time is set in accordance with the adjusting value (step S301). Next, the start of the reproduction of the BGM is instructed (step S302). Immediately after, the counting up of the delay time is started, and the advance of the process is suspended until the delay time elapses (step S303). Then, the scroll process is started when the delay time has just elapsed (step S304). After that, the play start process is terminated. Incidentally, the delay time increases or decreases in accordance with the adjusting value. As in the case of FIG. 5, when the adjusting value is 0, the delay time accords to the deviation amount between the times T1 and T2. Also, the delay time increases from the standard value as the adjusting value deviates toward the negative side, while decreases from the standard value as the adjusting value deviates toward the positive side. The scroll process is executed in parallel to the processes of steps S204 to S207 in FIG. 13, but the reference time thereof is different from the reference time for the evaluation as described in the above.

Figure 16:
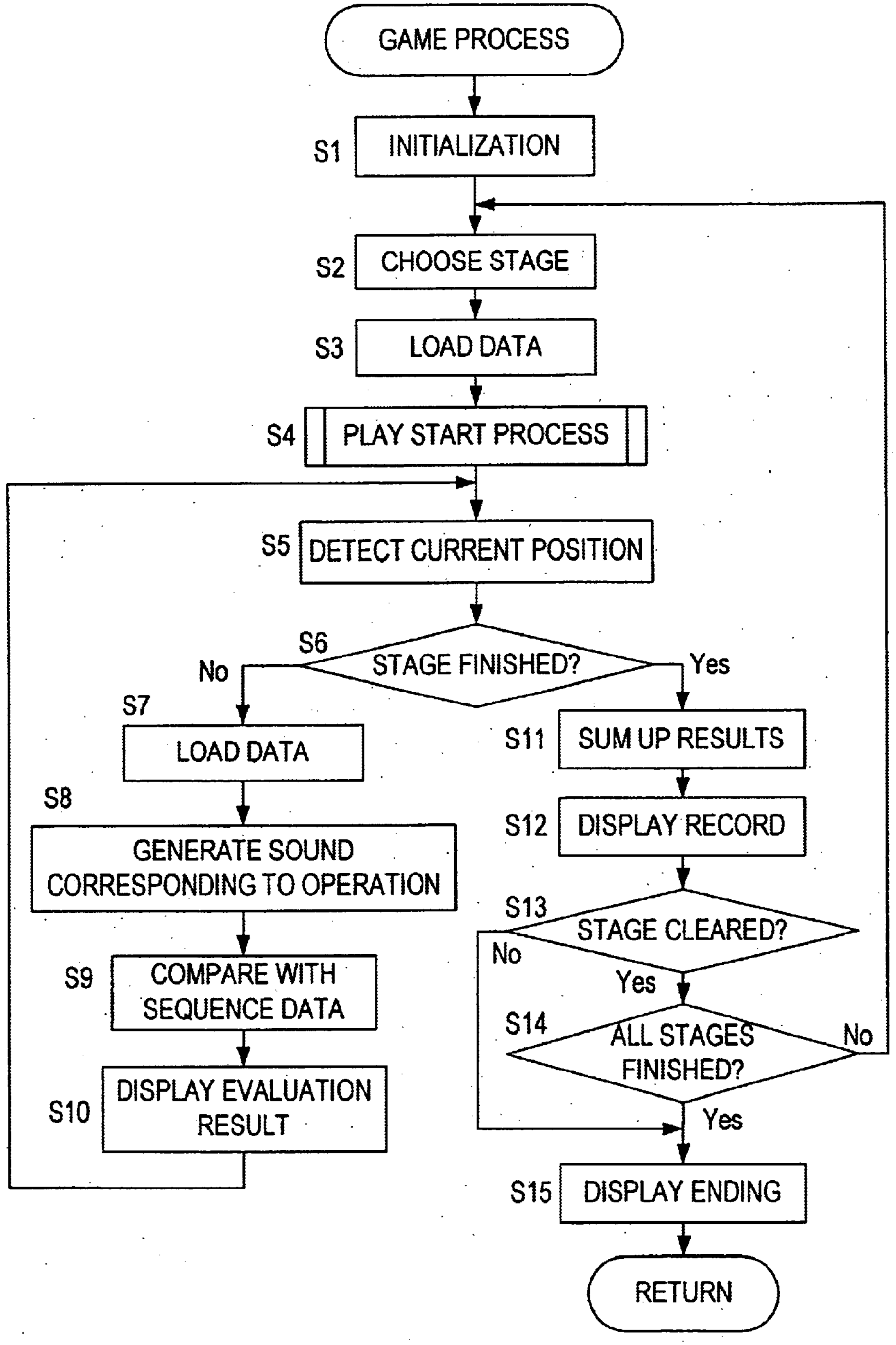
FIG. 16 is a flowchart showing a procedure to be executed when actually performing a game.

FIG. 16 shows a process executed in the case where the game is actually played in the game machine constructed as described above. After starting a game process, initialization is performed at step S1, and then the process to let the player choose the stage (step S2) is initiated. One stage is constituted by at least one tune. A plurality of stages is prepared, and tunes constituting each stage are different from each other. After the stage is chosen, data necessary for playing each tune constituting the stage are loaded into the RAM 3 (step S3), and then the play start process is executed at step S4. The detail of the play start process is the same as the procedures shown in FIG. 14. Incidentally, after starting the play, the clocking is started to specify the position in the tune with the proper position being as the reference (not shown in the figures). In the case of FIG. 5, as a one example, the clocking is done with the reproduction stat time T0 of the BGM being as the reference point. The current position in the tune is detected by using the clocking, which has been started as is described above (step S5), and then it is judged whether or not the tune advances to a stage termination position (step S6). If it is judged as a negative, the process for detecting the operation of the played is performed (step S7), and then a sound generating process corresponding to the detected operation is done (step S8) is executed. If the operation is not detected, the sound generating is not performed.

At subsequent step S9, the player's operation is evaluated by comparing the detected result of the operation and the performance sequence data with each other. The way the evaluation is performed has already been explained with reference to FIG. 6(*a*). After that, the evaluation result is displayed (step S10), and then the process returns to step S5. If it is judged as the stage termination position at step S6, then the process advances to step S11 to thereby sum up evaluation results at the present stage, and the record according to the summed result is displayed (step S12). On the basis of the record, it is judged whether or not the stage is cleared (step S13), and if the stage is cleared, then it is judged whether or not all stages are finished (step S14). If a negative judgment is made at step S14, the process returns to step S2. If a negative judgment is made at step S13, or an affirmative judgment is made at step S14, an ending of the game is displayed at step S15, and then the game process is terminated. Incidentally, the scroll process which has been started in the play process at step S4 is performed in parallel to the steps S5 to S10 in FIG. 16, but the reference time thereof is different from the reference time for the evaluation as explained in the above.

Figure 17:
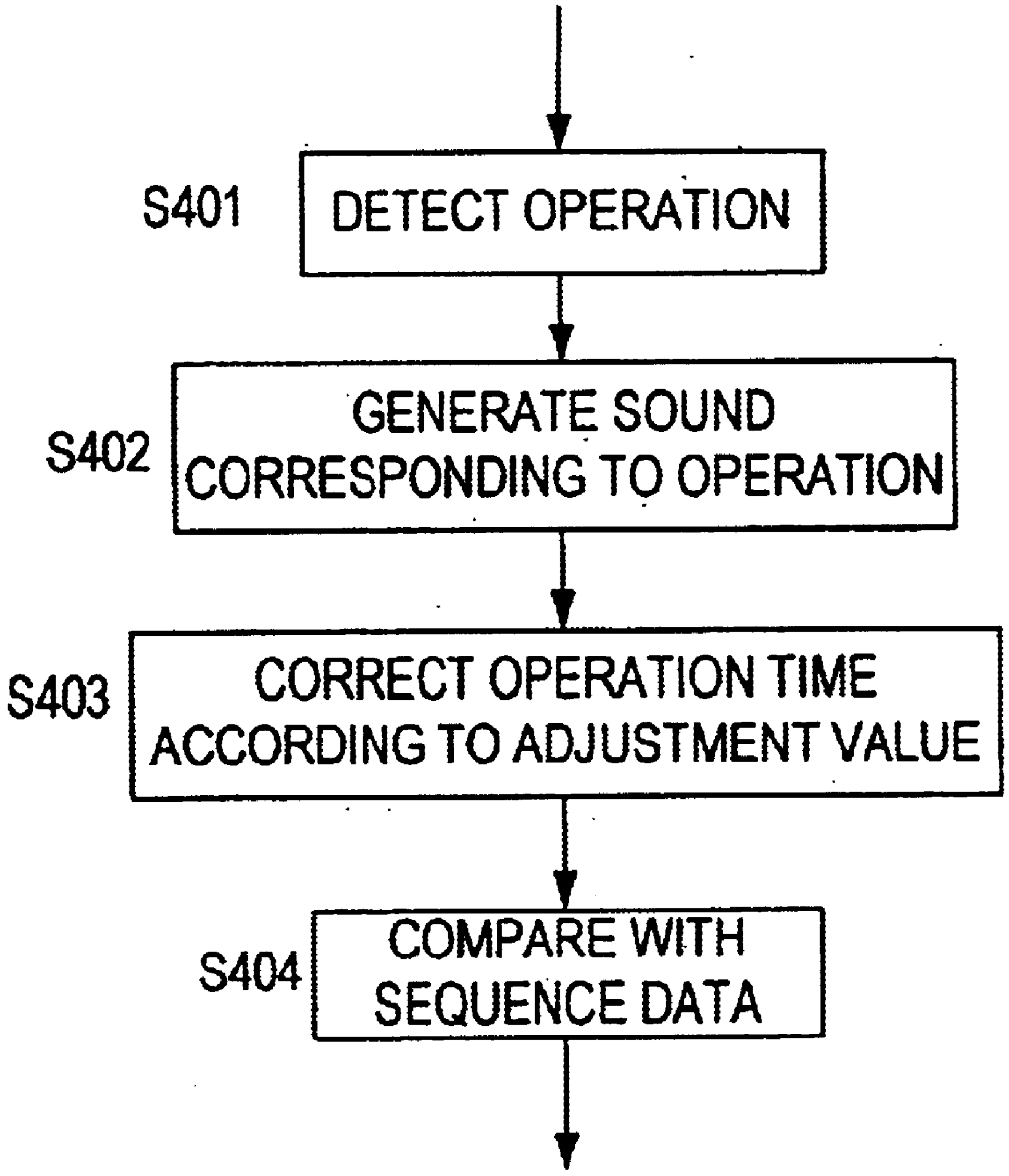
FIG. 17 is a flowchart showing a procedure to be executed instead of Steps S7 to S10 in FIG. 16 when adjusting operation detection timing as indicated in FIG. 6(*b*).

In the above embodiment, the timing of instructing the operation through the scroll process (the timing of instructing the operation through the coincidence of the objects 45 and 46 and the reference line 36) is changed in accordance with the adjustment value, while the evaluation of the operation is performed with the reproduction start position of the BGM being used as the reference. Accordingly, in the case where the player believes the controller 12 has been operated so as to exactly follow the instructed operation timing, while the deviation of the detection timing is occurred due to the responsiveness of the controller 12 or the like to thereby cause the problem that the player can not obtain the evaluation he or she believes to be appropriate, it is possible for the player to adjust the operation instruction timing to solve or reduce his or her feeling of inaccuracy. However, such adjustment can be done by another method. For example, as shown in FIG. 6(*b*), it may be acceptable to correct the timing Td of detecting the operation in accordance with the adjustment value, and to compare the corrected time Tc and the operation timing Tr defined in the performance sequence data. FIG. 17 shows a process to be executed instead of steps S7 to 9 of FIG. 16 to perform such correction. Step S401 corresponds to step S7, step S402 corresponds to step S8, step S404 corresponds to step S9, respectively, and at step S403, the timing when detecting the operation Td is corrected to the timing Tc in accordance with the adjustment value. Herein, it is assumed that the correction amount of the timing Tc is 0 when the adjustment value is 0. Under such presupposition, if the player feels that the operation timing instructed through the scroll process and wishes to advance the timing, namely, in the case where the player feels it necessary to delay the operation from the timing when he or she believes suitable to obtain higher evaluation, it is appropriate to set the adjustment value at a positive number and the detection timing Tc may be corrected so as to be delayed from the standard time. In the reverse case, the detection timing Tc may be corrected to be advanced from the standard time.

In FIGS. 6(*a*) and (*b*), there are symmetrically provided the evaluation ranges before and after the operation timing Tr defined in the performance sequence data. However, it may be possible to set the evaluation ranges asymmetrically as shown in FIG. 6(*c*) to thereby solve or reduce the feeling of inaccuracy.

Incidentally, the above explanations are directed to correcting inconsistency in the case that the player intends to perform the operation to exactly follow the timing when the objects 45 and 46 coincide with the reference line 36 while the evaluation is not appropriately high. However, even if the player performs the operation to follow the operation instruction timing and can obtain the evaluation, he or she believes is appropriate, there may be a deviation between the operation instruction timing itself and the beats of the BGM, so that the player may feel musical unpleasantness. In such case, besides the adjustment of the start time of the scroll process or the like, the reference time for the evaluation of the operation may be shifted from the reproduction start position of the BGM similarly in the case of the reference time for the scroll process.

The present invention is not limited to the game system in which the operation is instructed using the above described operation instruction picture 31, but can also be carried out in various other embodiments. For example, in the operation instruction picture 31, it is possible to fix the positions of the objects 45 and 46, while scrolling the reference line 36 to instruct the operation timing. The present invention can be applied to the system in which the display of the partition lines 40 and 42 is omitted, and the operation position is indicated by using the relationship between the objects 45 and 46 and the controller picture 32.

On the contrary thereto, the display of the controller picture 31 may be omitted, while the operation position may be indicated by using the relationship between the partition lines 40 and 42 and the objects 45 and 46. Further, it may be possible to omit both the controller picture 32 and the partition lines 40 and 42, and to indicate which position on the controller 12 should be operated with referring only to the position of the objects 45 and 46 in the right-and-left direction.

The present invention is not limited to the music simulation game, but can also be applied to various game system as long as the system satisfies the condition that the reference data defining the operation timing are prepared in advance, the operation timing is instructed to the player based on that data, and the timing when the operation is performed is detected to thereby evaluate the operation. The present invention is not limited to the household game machine, but can also be applied to the arcade-type game machine.

What is claimed is:

1. A game system comprising:

a storage device for storing a reference data defining timing of at least one operation to be performed by a player on an input device in association with an elapsed time from a predetermined position used as a reference in a game;

an operation instruction device for instructing the player operation timing based on the reference data;

an operation detection device for detecting actual timing of an actual operation performed on the input device by the player;

an evaluation device for evaluating the actual operation detected by the operation detection device by comparing the timing of the operation defined in the reference data and the detected actual timing with each other;

an adjustment value setting device for making the player perform a predetermined adjustment value setting operation and for setting an adjustment value to correct an evaluation result based on a result of execution of the adjustment value setting operation; and an adjustment execution device for adjusting a deviation amount between the timing defined in the reference data and the actual timing detected by the operation detection device based on the adjustment value.

2. The game system according to claim 1, wherein said adjustment value setting device changes the adjustment value based on an amount of an operation by the player to a specific operation portion in the input device.

3. The game system according to claim 1, wherein the adjustment value setting device causes the operation instruction device to issue an instruction for an operation at predetermined timing with said predetermined position being used as a reference, and sets the adjustment value based on a deviation amount between said instructed timing of the operation and an actual timing detected by the operation detection device in response to said instruction.

4. A game system comprising:

a storage device for storing a reference data defining timing of at least one operation to be performed by a player on an input device in association with an elapsed time from a predetermined position used as a reference in a game;

an operation instruction device for instructing the player operation timing based on the reference data;

an operation detection device for detecting actual timing of an actual operation performed on the input device by the player;

an evaluation device for evaluating the actual operation detected by the operation detection device by comparing the timing of the operation defined in the reference data and the detected actual timing with each other;

an adjustment value setting device for making the player perform a predetermined adjustment value setting operation and for setting an adjustment value to correct an evaluation result based on a result of execution of the adjustment value setting operation; and an adjustment execution device for changing a relationship between a deviation amount of the actual timing detected by the operation detection device to the timing defined in the reference data and an evaluation result by the evaluation device based on the adjustment value.

5. The game system according to claim 4, wherein said adjustment value setting device changes the adjustment value based on an amount of an operation by the player to a specific operation portion in the input device.

6. The game system according to claim 4, wherein the adjustment value setting device causes the operation instruction device to issue an instruction for an operation at predetermined timing with said predetermined position being used as a reference, and sets the adjustment value based on a deviation amount between said instructed timing of the operation and an actual timing detected by the operation detection device in response to said instruction.

7. A game system comprising:

a tune reproduction device for reproducing a tune with a predetermined position in a game being used as a reference;

a storage device for storing a reference data defining timing of at least one operation to be performed by a player on an input device during a reproduction of the tune in association with a given position in the tune to be reproduced in a game;

an operation instruction device for instructing the player operation timing based on the reference data during the reproduction of the tune;

an operation detection device for detecting actual timing of an actual operation performed on the input device by the player during the reproduction of the tune;

an evaluation device for evaluating the actual operation detected by the operation detection device by comparing the timing of the operation defined in the reference data and the detected actual timing with each other;

an adjustment value setting device for making the player perform a predetermined adjustment value setting operation and for setting an adjustment value to correct an evaluation result based on a result of execution of the adjustment value setting operation; and an adjustment execution device for adjusting a deviation amount between the timing of the operation defined in the reference data and the actual timing detected by the operation detection device based on the adjustment value.

8. A game system comprising:

a tune reproduction device for reproducing a tune with a predetermined position in a game being used as a reference;

a storage device for storing a reference data defining timing of at least one operation to be performed by a player on an input device during a reproduction of the tune in association with a given position in the tune to be reproduced in a game;

an operation instruction device for instructing the player operation timing based on the reference data during the reproduction of the tune;

an operation detection device for detecting actual timing of an actual operation performed on the input device by the player during the reproduction of the tune;

an evaluation device for evaluating the actual operation detected by the operation detection device by comparing the timing of the operation defined in the reference data and the detected actual timing with each other;

an adjustment value setting device for making the player perform a predetermined adjustment value setting operation and for setting an adjustment value to correct an evaluation result based on a result of execution of the adjustment value setting operation; and an adjustment execution device for changing a relationship between a deviation amount of the actual timing detected by the operation detection device to the timing defined in the reference data and an evaluation result by the evaluation device based on the adjustment value.

9. A computer readable storage medium storing a program which causes a computer provided in a game system to serve as:

an operation instruction device for instructing a player operation timing based on a reference data which defines timing of at least one operation to be performed by the player on an input device in association with an elapsed time from a predetermined position used as a reference in a game;

an operation detection device for detecting actual timing of an actual operation performed on the input device by the player;

an evaluation device for evaluating the actual operation detected by the operation detection device by comparing the timing of the operation defined in the reference data and the detected actual timing with each other;

an adjustment value setting device for making the player perform a predetermined adjustment value setting operation and for setting an adjustment value to correct an evaluation result based on a result of execution of the adjustment value setting operation; and an adjustment execution device for adjusting a deviation amount between the timing defined in the reference data and the actual timing detected by the operation detection device based on the adjustment value.

10. The computer readable storage medium according to claim 9, wherein said adjustment value setting device changes the adjustment value based on an amount of an operation by the player to a specific operation portion in the input device.

11. The computer readable storage medium according to claim 9, wherein the adjustment value setting device causes the operation instruction device to issue an instruction for an operation at predetermined timing with said predetermined position being used as a reference, and sets the adjustment value based on a deviation amount between said instructed timing of the operation and an actual timing detected by the operation detection device in response to said instruction.

12. A computer readable storage medium storing a program which causes a computer provided in a game system to serve as:

an operation instruction device for instructing a player operation timing based on a reference data which defines timing of at least one operation to be performed by the player on an input device in association with an elapsed time from a predetermined position used as a reference in a game;

an operation detection device for detecting actual timing of an actual operation performed on the input device by the player;

an evaluation device for evaluating the actual operation detected by the operation detection device by comparing the timing of the operation defined in the reference data and the detected actual timing with each other;

an adjustment value setting device for making the player perform a predetermined adjustment value setting operation and for setting an adjustment value to correct an evaluation result based on a result of execution of the adjustment value setting operation; and an adjustment execution device for changing a relationship between a deviation amount of the actual timing detected by the operation detection device to the timing defined in the reference data and an evaluation result by the evaluation device based on the adjustment value.

13. The computer readable storage medium according to claim 12, wherein said adjustment value setting device changes the adjustment value based on an amount of an operation by the player to a specific operation portion in the input device.

14. The computer readable storage medium according to claim 12, wherein the adjustment value setting device causes the operation instruction device to issue an instruction for an operation at predetermined timing with said predetermined position being used as a reference, and sets the adjustment value based on a deviation amount between said instructed timing of the operation and an actual timing detected by the operation detection device in response to said instruction.

15. A computer readable storage medium storing a program which causes a computer provided in a game system to serve as:

a tune reproduction device for reproducing a tune with a predetermined position in a game being used as a reference;

an operation instruction device for instructing a player operation timing during the reproduction of the tune based on a reference data which defines timing of at least one operation to be performed by the player on an input device during a reproduction of the tune in association with a given position in the tune to be reproduced in the game;

an operation detection device for detecting actual timing of an actual operation performed on the input device by the player during the reproduction of the tune;

an evaluation device for evaluating the actual operation detected by the operation detection device by comparing the timing of the operation defined in the reference data and the detected actual timing with each other;

an adjustment value setting device for making the player perform a predetermined adjustment value setting operation and for setting an adjustment value to correct an evaluation result based on a result of execution of the adjustment value setting operation; and an adjustment execution device for adjusting a deviation amount between the timing of the operation defined in the reference date and the actual timing detected by the operation detection device based on the adjustment value.

16. A computer readable storage medium storing a program which causes a computer provided in a game system to serve as:

a tune reproduction device for reproducing a tune with a predetermined position in a game being used as a reference;

an operation instruction device for instructing a player operation timing during the reproduction of the tune based on a reference data which defines timing of at least one operation to be performed by the player on an input device during a reproduction of the tune in association with a given position in the tune to be reproduced in the game;

an operation instruction device for instructing the player operation timing based on the reference data during the reproduction of the tune;

an operation detection device for detecting actual timing of an actual operation performed on the input device by the player during the reproduction of the tune;

an evaluation device for evaluating the actual operation detected by the operation detection device by comparing the timing of the operation defined in the reference data and the detected actual timing with each other;

an adjustment value setting device for making the player perform a predetermined adjustment value setting operation and for setting an adjustment value to correct an evaluation result based on a result of execution of the adjustment value setting operation; and an adjustment execution device for changing a relationship between a deviation amount of the actual timing detected by the operation detection device to the timing defined in the reference data and an evaluation result by the evaluation device based on the adjustment value.

* * * * *